US012244520B2

(12) United States Patent
Lochhead et al.

(10) Patent No.: US 12,244,520 B2
(45) Date of Patent: Mar. 4, 2025

(54) NETWORK SERVICE INTEGRATION INTO A NETWORK FABRIC OF A DATA CENTER

(71) Applicant: Cyxtera Data Centers, Inc., Coral Gables, FL (US)

(72) Inventors: Jason Anthony Lochhead, Frisco, TX (US); Manikandan Subramanian, Flower Mound, TX (US); David Hess, Arlington, TX (US); Michael Andra Ballard, Coppell, TX (US); Adam Scott Wayne, Keller, TX (US)

( * ) Notice: Subject to any disclaimer, the term of this patent is extended or adjusted under 35 U.S.C. 154(b) by 0 days.

(21) Appl. No.: 17/895,909

(22) Filed: Aug. 25, 2022

(65) Prior Publication Data

US 2022/0417182 A1   Dec. 29, 2022

Related U.S. Application Data

(63) Continuation of application No. 16/695,734, filed on Nov. 26, 2019, now Pat. No. 11,431,654, which is a continuation-in-part of application No. 16/442,997, filed on Jun. 17, 2019, now Pat. No. 11,374,879.

(51) Int. Cl.
*H04L 49/354* (2022.01)
*G06F 3/04842* (2022.01)
*H04L 12/46* (2006.01)
*H04L 12/54* (2022.01)
*H04L 41/5009* (2022.01)
(Continued)

(52) U.S. Cl.
CPC ........ *H04L 49/354* (2013.01); *G06F 3/04842* (2013.01); *H04L 12/4641* (2013.01); *H04L 12/5691* (2013.01); *H04L 41/5009* (2013.01); *H04L 43/0817* (2013.01); *H04L 49/20* (2013.01)

(58) Field of Classification Search
CPC ............... H04L 49/354; H04L 12/4641; H04L 12/5691; H04L 41/5009; H04L 43/0817; H04L 49/20; H04L 41/0806; H04L 45/583; H04L 2/4625; H04L 41/22; G06F 3/04842

See application file for complete search history.

(56) References Cited

U.S. PATENT DOCUMENTS

| | | | |
|---|---|---|---|
| 8,943,490 B1 * | 1/2015 | Jain ........................... | G06F 8/65 717/172 |
| 9,270,619 B2 * | 2/2016 | Senniappan ............ | H04L 49/70 |
| 10,083,026 B1 * | 9/2018 | Venkata .................. | G06F 8/656 |

(Continued)

*Primary Examiner* — Atique Ahmed
(74) *Attorney, Agent, or Firm* — Greenberg Traurig

(57) ABSTRACT

Top-of-rack (TOR) switches are connected to a network fabric of a data center. Each TOR switch corresponds to a rack of the data center, and is configured to provide access to the network fabric for computing devices mounted in the rack. In one method, a client device of a user is used to select various network service options. The service options correspond to services that can be provided to computing equipment of the user that is mounted in various racks of the data center. In response to receiving the selection of one or more service options, the network fabric of the data center is configured to connect the computing equipment to the selected services. In one approach, the network fabric is configured by creating and/or configuring one or more virtual networks to provide the connection to the services.

20 Claims, 13 Drawing Sheets

(51) Int. Cl.
  *H04L 43/0817* (2022.01)
  *H04L 49/20* (2022.01)

(56) References Cited

U.S. PATENT DOCUMENTS

| | | | |
|---|---|---|---|
| 10,498,611 B1* | 12/2019 | Kloberdans | H04L 41/40 |
| 11,431,654 B2 | 8/2022 | Lochhead et al. | |
| 2002/0158900 A1 | 10/2002 | Hsieh et al. | |
| 2004/0098320 A1* | 5/2004 | Mitsuhashi | G06Q 30/0601 705/26.1 |
| 2009/0201293 A1* | 8/2009 | Tung | G06Q 10/04 713/100 |
| 2010/0142544 A1 | 6/2010 | Chapel et al. | |
| 2010/0217780 A1* | 8/2010 | Erola | H04L 51/58 709/227 |
| 2013/0019277 A1* | 1/2013 | Chang | H04L 63/0227 726/1 |
| 2013/0054426 A1 | 2/2013 | Rowland et al. | |
| 2014/0108665 A1 | 4/2014 | Arora et al. | |
| 2015/0103692 A1* | 4/2015 | Jain | H04L 41/0806 370/254 |
| 2015/0372920 A1* | 12/2015 | Wang | H04L 41/0663 370/235 |
| 2017/0063614 A1 | 3/2017 | Hartwig | |
| 2017/0142196 A1* | 5/2017 | Sun | H04L 67/1008 |
| 2017/0214707 A1* | 7/2017 | Grubel | G06F 21/564 |
| 2018/0095845 A1* | 4/2018 | Sanakkayala | G06F 11/203 |
| 2018/0287902 A1* | 10/2018 | Chitalia | H04L 43/0876 |
| 2018/0287905 A1* | 10/2018 | Mehta | H04L 47/2483 |
| 2020/0028786 A1 | 1/2020 | Chachmon et al. | |
| 2020/0059420 A1 | 2/2020 | Abraham | |
| 2020/0073692 A1* | 3/2020 | Rao | H04L 12/4633 |
| 2020/0396181 A1 | 12/2020 | Lochhead et al. | |

* cited by examiner

NETWORK SERVICE INTEGRATION INTO A NETWORK FABRIC OF A DATA CENTER

RELATED APPLICATIONS

The present application is a continuation application of U.S. patent application Ser. No. 16/695,734 filed Nov. 26, 2019, entitled "NETWORK SERVICE INTEGRATION INTO A NETWORK FABRIC OF A DATA CENTER" which is a continuation-in-part application of U.S. Non-Provisional application Ser. No. 16/442,997, filed Jun. 17, 2019, entitled "NETWORK CONFIGURATION OF TOP-OF-RACK SWITCHES ACROSS MULTIPLE RACKS IN A DATA CENTER," by Jason Anthony Lochhead, the entire contents of which applications are incorporated by reference as if fully set forth herein.

FIELD OF THE TECHNOLOGY

At least some embodiments disclosed herein relate to using networks to provide services in general and more particularly, but not limited to integration of services into a network fabric of a data center.

BACKGROUND

A data center is a physical facility that houses computing systems and related networking equipment. For example, a service provider can house its computer servers at one physical location in order to manage the servers more efficiently. The servers in a data center are typically connected to users of the computer servers via the Internet, or a wide area network (WAN). The computer servers in the data center typically host applications and provide services.

The computer servers and other related components such as network switches, routers, etc., in a data center are housed in metallic cages referred to as racks. For example, a rack includes a chassis to house the computer servers. In some cases, a computer server in the form of a blade is mounted to the chassis. The rack has a wire harness for network cables that connect each blade to a computer network. Other cables provide power to each blade.

In some cases, each server mounted in the rack may be configured to host one or more virtual machines. The servers in the rack are connected to top-of-rack (TOR) switch devices. The TOR switches are connected to other TOR switches via a spine switch or spine underlay fabric. This provides a physical network that can be used by multiple tenant networks to exchange data communications between host devices in different rack units. For example, packets of data may be sent from a virtual machine in one rack unit to a virtual machine in another rack unit. The packets can be routed between corresponding TOR switch devices and an intermediary spine switch. The TOR switches are configured to store address information associated with the host devices in the data center environment.

TOR switches typically manage communications (e.g., routing and forwarding) that originate from and/or destined for physical servers (and virtual machines and virtual switches hosted by the physical servers) in a rack. Each TOR switch can be configured to communicate with a network controller unit that manages communications between TOR switches in different racks. In some cases, tenant networks residing in an underlay fabric can be created, modified, provisioned, and/or deleted.

In one example, virtual switches and virtual machines are created and run on each physical server on top of a hypervisor. Each virtual switch can be configured to manage communications of virtual machines in a particular virtual network. Each virtual machine is a member of a tenant network (e.g., a layer 3 subnet that contains one or more VLANs).

In one example, a TOR switch includes network ports for receiving and sending data packets to and from physical servers mounted in the racks. The ports are coupled to a switch application specific integrated circuit (ASIC) that enables packets received on one port to be forwarded to a device in the system via a different port.

In some cases, the TOR switches are used in a hyper-converged infrastructure (HCI) computing environment. HCI is a virtual computing platform used to converge computer, networking, and storage into a single software-defined architecture. The HCI computing environment can include thousands of devices such as servers and network switches. HCI services can be used to configure the network switches. In one example, an internet protocol (IP) address is configured for each network switch. In one example, an HCI management service maintains a listing of network configurations applied to network switches in various racks. In one example, the management service accesses a listing of network configurations applied to a first network switch, and dynamically applies the network configurations to a second network switch.

In one example, a first network switch resides in a slot on a rack of a data center. The HCI management service uses a data store or other memory to maintain network configurations that have been applied to the first network switch. For example, the network configurations may include switch bring-up configurations, management cluster configurations, and workload configurations.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
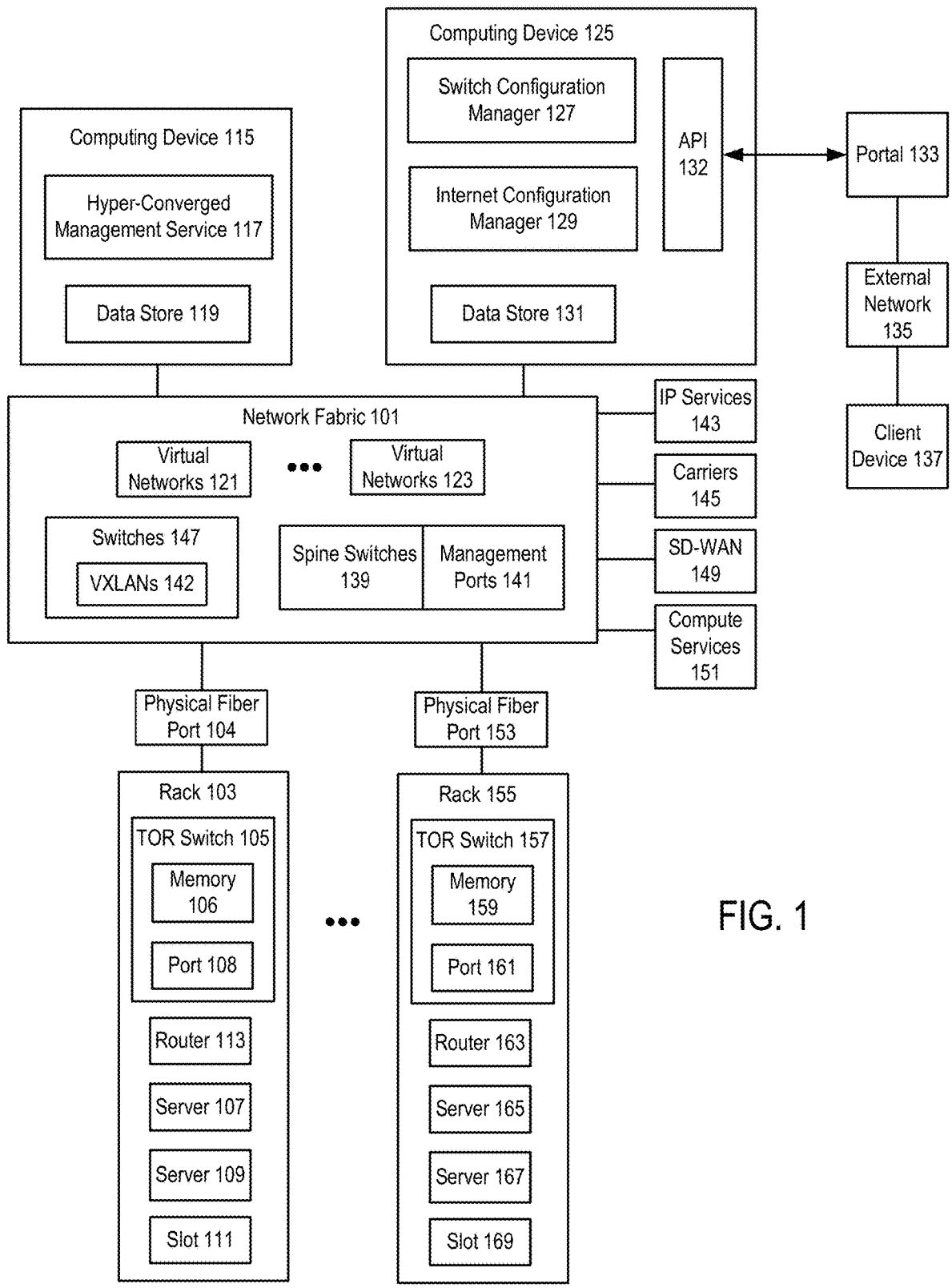
FIG. 1 shows an example data center that includes a network fabric connecting top-of-rack switches for racks in which various computing equipment is mounted, according to one embodiment.

At least some embodiments herein relate to configuring network switches in a data center. In one example, the network switches are top-of-rack (TOR) switches. Alternatively and/or additionally, other types of network switches can be configured. In one example, the TOR switches are connected to a network fabric of the data center. The network fabric connects TOR switches used in various racks that are housed in the data center. Each rack mounts various computing hardware such as physical servers, routers, etc.

Other embodiments relate to automatically deploying internet connectivity to racks in a data center. For example, the internet connectivity includes internet protocol (IP) services provided on demand in real-time to various customers that install computing equipment in racks of the data center. The customers can request the internet connectivity using a portal. In some cases, TOR switches for the racks can be configured as described below (e.g., using the same portal). The embodiments regarding deploying internet connectivity are described in the section below titled "Automated Deployment of Internet Connectivity".

Yet other embodiments relate to configuring networks and/or controlling access to switches or other computing devices in a data center. In one example, a request is received to configure a TOR switch in a rack of a customer of the data center. In response to receiving the request, the data center automatically configures the TOR switch to connect a server to one or more virtual networks in a network fabric of the data center. In another example, physical access to the racks of a customer is controlled by the data center. A request to access a rack is received from a client device of the customer. In response receiving the request, the customer is provided physical access to its racks. In one example, the physical access is provided by automatically unlocking one or more doors (and/or configuring other physical access capability) that permit the customer to physically access the racks. The embodiments regarding configuring networks and/or controlling access to switches or other computing devices in a data center are described in the section below titled "Automated Access to Racks in a Colocation Data Center".

Additional embodiments relate to integration of network and/or other services into a network fabric of a data center. In one embodiment, a customer of the data center uses a client device to select various service options. The service options correspond to services that can be provided to computing equipment of the customer that is mounted in various racks of the data center. In response to receiving the selection of one or more service options, the network fabric of the data center is configured to connect the customer's computing equipment to the selected services. In one embodiment, the network fabric is configured by creating and/or configuring one or more virtual networks. The embodiments regarding integration of network and/or other services into a network fabric of a data center are described in the section below titled "Service Integration into Network Fabric".

A significant problem with existing data centers is the long time required to deploy information technology (IT) infrastructure in a data center (e.g., provisioning of new hardware servers and applications that run on the servers). For example, it can take three to six months to deploy a single application, including provisioning of circuits, building out infrastructure in a colocation cage, installation and configuration of the hypervisor, and loading and testing of the application. The time to provision network connectivity and services often constrains colocation deployments of new workloads or applications.

Another problem is difficulty in accurately forecasting bandwidth and overall IT capacity requirements more than a few months in advance. This results in many organizations initially over-provisioning to assure that adequate bandwidth and compute resources are available as demand grows.

Various embodiments described below provide a technological solution to one or more of the above technical problems. In one embodiment, a method includes: mounting a switch in a rack (e.g., a TOR switch of a rack in a data center), wherein the rack is configured for mounting a server connected to the switch; connecting the switch to a network fabric; receiving, by a switch configuration manager from a client device (e.g., a client device of a service provider customer that is deploying new IT infrastructure in the data center), instructions to create a virtual network; in response to receiving the instructions, creating the virtual network; and configuring, by the switch configuration manager and based on the instructions, the switch to associate the virtual network with the switch.

In one example, the switch configuration manager is software executed by a computing device connected to the network fabric of a data center that houses racks of computer hardware, including the rack above. The switch configuration manager configures the TOR switches for all racks physically located in the data center. The switch configuration manager is accessed by service provider customers of the data center using an application programming interface (API) of the switch configuration manager. For example, a client device for each customer can use the API to configure the TOR switches for its racks when the customer is deploying new IT infrastructure in the data center.

In one case, the virtual network is a first virtual network, and the method further includes: receiving, from a user interface of the client device, a request to create a group of networks, the group including the first virtual network; in response to receiving the request, creating the group of networks; and in response to receiving a user selection made in the user interface, connecting the group of networks to a group of racks, the connecting including automatically configuring ports of a TOR switch for each rack in the group of racks to provide access, by a respective server in each rack, to each network in the group of networks.

In one embodiment, a service provider or other customer is provided a user interface (UI) and an API. In one example, the service provider is a cloud service provider, a software as a service (SaaS) provider, or a managed hosting provider. The UI presents customer ports, compute nodes, and other elements connected to the network fabric of the data center. The customer can create virtual networks or groups of virtual networks using the UI. The customer can bundle several virtual networks into a defined group (and optionally assign a text label to the group). The customer can then use the UI to connect the defined group between racks and other computing devices. Data center automation software (e.g., executing on a virtual server of the data center) examines data for the group and configures connections for the virtual networks in the group as needed.

In one embodiment, the data center automation software manages network connections to a customer's racks. The customer can use a portal (e.g., provided by a user application executing on a client device such as a mobile device) to connect a group of networks to a group of racks. In one example, each rack has a unique ID. The customer can see rack data, including location by metro region, on a display of its client device using the UI. The customer can also see IP connectivity instances (e.g., by metro or other geographic region) and ports in a metro or other geographic region that can be used to receive services over the network fabric. For example, multiple racks can all access the same IP connectivity instance. The portal displays endpoints and connections on the customer's client device, and the portal manages the relationship between the endpoints and connections.

In one embodiment, the portal provides control by the customer of a grouping mechanism for the customer's racks. The customer can manage network connections to its racks. In one example, the customer requests that a group of networks be connected to a group of racks. Then, the data center automation software configures these connections. In one embodiment, the data center automation software includes the switch configuration manager described above.

In one example, a customer creates a group, and assigns networks to the group. On the backend, the association of the networks to the group is tracked by the data center automation software. When a new request is made to make a new connection to the group, all networks that are part of the group are examined, and individual configurations are implemented as required to make the new connection.

In one embodiment, devices and ports to be connected to the above networks are identified. For each network, endpoints are determined, and work required to implement the connections is identified as one or more workflows. In one example, a workflow engine (e.g., software executing on a virtual machine of an administrator computing device of the data center) executes tasks in the workflows.

In one embodiment, colocation racks can be delivered to the customer faster than when using prior approaches. The racks are standalone racks that include power, a locking mechanism for each rack, and network switches that are tied to the network fabric of the data center. In some cases, IP transit is provided for servers in the racks for internet connectivity. In one example, a customer signs a service agreement and the customer is added to an authentication service used in the data center. The authentication service manages access by and identifies the customer for the data center. The customer logs into a command center of the data center (e.g., the command center can be implemented by software that includes the switch configuration manager above). The customer then selects a data center location, and specifies an order for a quantity of racks (e.g., from one rack to a predetermined limit).

Next, the command center performs various actions. The command center maintains a database of available rack inventory at various geographic data center locations worldwide. In response to the customer selection, the command center allocates racks from available inventory in the location selected by the customer. The authentication service is updated with rack assignment information corresponding to these allocated racks.

A security system at each physical data center facility where the selected racks are located is updated so that the customer is allowed to physically access the racks. A lock system used on the racks is configured to allow the customer to access the selected racks. In some cases, IP connectivity (e.g., to provide internet access) is provision and connected to the TOR switches for the selected racks. Then, the portal is updated with the locations of the selected racks, TOR switch information for the racks, and IP connectivity information (e.g., VLAN, subnet, and default gateway configuration information) for the racks. Billing of the customer for the colocation service is initiated (e.g., by electronic communication). Finally, the customer is notified by electronic communication or otherwise when the foregoing provisioning is complete.

After the command center performs the actions above, the customer can perform various actions. First, the customer accesses the command center to complete user setup, including uploading or taking a photo via the portal. In one example, the customer accesses the command center using the client device above. In one example, the client device is a mobile device having a camera and is used to take a photo of personnel associated with the customer. The photo is uploaded to the command center via the API above.

When the customer physically arrives at a data center location, the customer checks in with security to receive a badge. The badge includes the photo previously provided by the customer above. The customer enters the facility and unlocks the selected racks using the badge. In one example, the badge contains security credentials necessary to unlock the locking mechanism on the selected racks. The customer installs computing equipment in the selected racks, and then cables the equipment to the TOR switches above. The customer then accesses the command center and configures ports of the TOR switches. In one example, the switch ports are configured with a virtual local area network (VLAN) configuration desired for use by the customer.

In one embodiment, the operator of the data center buys hardware equipment and installs it in racks. The equipment is made available to customers on demand. This permits customers to avoid having to build equipment for peak demand. In one example, a customer can purchase computing resources that are supported by this equipment. In one example, the purchased computing resources are based on a hyper-converged infrastructure (HCI). For example, the customer can use the portal above to select computing resources. In one example, the computing resources are connected to one or more virtual networks configured by the customer using the portal. The command center above configures the TOR switches to connect these virtual networks to the hardware equipment of the data center.

In one embodiment, an on-demand IT infrastructure is provided to customers. In one example, the infrastructure is provided using an on-demand consumption model. In one example, the infrastructure is a physically-isolated on-demand hyper-converged infrastructure. The network fabric is a software-defined network fabric that provides connectivity via a secure layer 2 network throughout the data center. The customer can request access to network providers with direct connections to private or public cloud resources.

In one embodiment, a customer installs its own equipment in a first rack. The customer configures the TOR switches of the first rack using a portal as described above. The command center above configures ports of the TOR switches to implement the configuration requested by the customer. In addition, the customer can configure and deploy equipment in a second rack that has been pre-installed and is owned by the operator of the data center. The second rack includes equipment that provides a so-called "compute node" for deployment by the customer. In one example, the compute node is a dedicated self-contained HCI unit that combines computer resources (e.g., CPU cores), memory resources (e.g., RAM), and storage resources (e.g., hard disk drive and solid-state disk) into a pre-configured integrated appliance. A group of compute nodes forms a cluster.

In one example, the compute nodes provide dedicated hardware for a customer upon which the customer can deploy its desired hypervisor. The customer can then configure and manage the resources and virtual machines needed to run desired workloads. In one example, the customer uses the portal above to create one or more virtual networks that connect one or more servers of the first rack to one or more servers of the second rack. The first rack and second rack can be in different data centers.

In one embodiment, the network fabric of the data center above is a software-defined network fabric to link customers and resources throughout the data center. The network fabric uses an architecture to assure that each customer's traffic is logically isolated and protected through the use of a virtual extensible local area network (VXLAN) protocol. Using the API above, the client device of the customer can define, provision, and configure private virtual layer 2 networks. In one example, logical services are delivered to servers in a rack of the customer as virtual networks using VXLANs. In one example, all physical connections are delivered with an Ethernet layer 2 interface. In one example, multiple services are delivered to customer servers over a single physical connection. In one example, the physical connection is a physical port implemented using single-mode fiber operating at 1-10 Gbps.

In light of the above, automated configuration of network switches in a data center can provide one or more various advantages. For example, customer colocation access can be automated and provided more quickly than using prior approaches. For example, colocation access can be provided in less than 48 hours (e.g., the same day) from receipt of the initial request by the customer. For example, deployment of Internet connectivity to rack switches can be automated. For example, multiple security systems and multiple rack switches can be configured simultaneously. For example, self-service configuration of TOR switches across multiple racks can be provided.

Other advantages can include, for example, one or more of the following:
  Provisioning hyper-converged infrastructure in a shorter period of time.
  Extending colocation environments and connectivity within or across data centers in different geographic locations.
  Retaining full control by the customer over its network and compute environment, with dedicated hardware.
  Reducing complexity by delivering multiple services over a single physical network connection.

FIG. 1 shows an example data center that includes a network fabric 101 connecting top-of-rack (TOR) switches 105, 157 for racks 103, 155 in which various computing equipment is mounted, according to one embodiment. The computing equipment mounted in rack 103 includes the TOR switch 105, and also servers 107, 109, and router 113. Rack 103 has a slot 111 in which additional equipment can be mounted (e.g., slot 111 and/or other slots can be used by a customer of the data center to install customer-owned equipment in rack 103).

TOR switch 105 includes memory 106 and various ports (e.g., port 108) for receiving and sending communications (e.g., data packets). Memory 106 stores a network configuration (e.g., port connection assignments) as implemented by switch configuration manager 127 over network fabric 101 in response to a customer request received over a portal 133. Various ports of TOR switch 105 connect to router 113 and/or servers 107, 109. Other ports of TOR switch 105 connect to one or more virtual networks 121, 123 of network fabric 101. In one embodiment, all communications between rack 103 and network fabric 101 pass through a physical fiber port 104 (e.g., implemented using single-mode fiber).

Rack 155 mounts computer equipment including the TOR switch 157, servers 165, 167, and router 163. Rack 155 includes a slot 169 for adding additional equipment. TOR switch 157 includes memory 159 and various ports, including port 161. Similarly, as for rack 103, all communications to and from the network fabric 101 pass through a physical fiber port 153. Also, similarly as for rack 103, memory 159 is used to store data regarding a configuration of TOR switch 157 as automatically implemented by switch configuration manager 127. In one example, this configuration is implemented in response to a selection made by a customer in a user interface of client device 137. The data center of FIG. 1 can include numerous other racks connected to network fabric 101 using physical fiber ports and/or other types of connections.

The virtual networks 121, 123 of network fabric 101 can overlay various types of physical network switches. In one embodiment, network fabric 101 comprises network switches 147 that are used to implement virtual extensible local area networks (VXLANs) 142 for transmission of data from a server of rack 103 to a server mounted in a different rack, such as rack 155. In one example, a virtual network connected to TOR switch 105 is converted into a VXLAN 142 for transmission of data from server 107 to server 165. The VXLAN 142 is used to transmit the data to another virtual network connected to TOR switch 157. VXLANs 142 can be configured by switch configuration manager 127 to implement the foregoing connection between servers. In one embodiment, this configuration is implemented in response to a request from client device 137 to add server 165 to a virtual network that includes server 107.

In one embodiment, network fabric 101 includes spine switches 139 as part of a physical switching fabric. Spine switches 139 include management ports 141, which can be used by switch configuration manager 127 to configure spine switches 139.

In one example, network fabric 101 is a leaf-spine data center switching fabric. In one example, network fabric 101 is a software-defined network (SDN) controller-based data center switching fabric. In one example, the switching fabric supports all workloads (e.g., physical, virtual machine, and container) and choice of orchestration software. The switching fabric provides layer 2 (L2) switching, and layer 3 (L3) routing. In one example, the switching fabric is scalable, resilient, has no single point of failure, and/or supports headless mode operations.

In one embodiment, a computing device 115 (e.g., a server or virtual machine) is connected to network fabric 101. Computing device 115 executes a hyper-converged management service 117, which can be used to allocate compute, memory, and/or storage resources provided by various racks, including rack 103 and/or rack 155. Data store 119 is used to store data regarding this allocation of resources.

In one embodiment, a customer installs its own equipment into rack 103. Using client device 137, the customer sends a request for additional resources to add to its computing environment in the data center. In response to this request, hyper-converged management service 117 allocates resources of servers in rack 155 for use by the customer. In one example, virtual machines are created on rack 155 for handling workloads of the customer.

In one embodiment, a computing device 125 is connected to network fabric 101. Switch configuration manager 127 executes on computing device 125 and performs various administrative functions for the data center (e.g., functions as described above). Some of the functions performed by switch integration manager 127 are responsive to communications received from client device 137 over an external network 135 through portal 133. Client device 137 uses API 132 of switch configuration manager 127 for these communications. Client device 137 also receives communications from switch configuration manager 127 using API 132. In one example, one or more of the communications cause a display of information in a user interface of client device 137. In one example, the user interface uses the information to display a configuration of a computing environment of a customer of the data center.

In one embodiment, in response to a communication from client device 137, switch configuration manager 127 creates and/or configures various virtual networks of network fabric 101 (e.g., virtual networks 121, 123, and/or VXLANs 142). In one example, certain virtual networks are assigned to a group as designated by a customer using client device 137. Data regarding creation and/or configuration of virtual networks (e.g., assignment of virtual networks to a group(s)) is stored in data store 131.

In one embodiment, a customer of the data center can use client device 137 to request internet connectivity for one or more racks in its computing environment. For example, the customer can request that internet connectivity be provided for use by servers 107, 109. Communications with client device 137 regarding internet connectivity also can be performed using API 132. In response to this request, internet configuration manager 129 can configure IP services 143 to provide this internet connectivity. Internet configuration manager 129 communicates configuration data needed by switch configuration manager 127 for configuring TOR switch 105 so that servers 107, 109 are connected to IP services 143, which provides the internet connectivity. Configuration data regarding this internet connectivity can also be stored in data store 131.

In one embodiment, the customer can request that one or more telecommunications carriers 145 be connected to racks in its computing environment (e.g., rack 103 or rack 155).

In one embodiment, the customer can request that servers in rack 103 or rack 155 be connected to a software-defined wide area network (SD-WAN) 149. In one example, SD-WAN 149 is used by a customer to extend its computer networks over large distances, to connect remote branch offices to data centers and each other, and/or to deliver applications and services required to perform various business functions.

In one embodiment, the customer can request compute services 151. In one example, compute services 151 include one or more virtual machines created for use in the customer's computing environment. In one example, the virtual machines are created and run on servers in racks of the data center. For example, hyper-converged management service 117 can create and manage these virtual machines.

In another example, compute services 151 include storage resources. The storage resources can be non-volatile memory devices mounted in racks of the data center (e.g., mounted in rack 155).

In one embodiment, a virtualization control system (e.g., implemented by hyper-converged management service 117 or otherwise by computing device 115) abstracts server, storage, and network hardware resources of the data center to provide a more granular virtual server, virtual storage, and virtual network resource allocation that can be accessed by a customer. A customer console provisioning interface is coupled to the virtualization control system to permit the customer to configure its new environment. In one example, the virtualization control system responds to requests received from client device 137.

In one embodiment, portal 133 is a web portal. Client device 137 provides a user interface that enables a customer/user to associate a specified network connection with a new computing environment. The new computing environment can be associated with a number of virtual machines that is specified in the user interface.

In one embodiment, a customer can use the user interface to create, provision, and manage its virtual resources across numerous virtual environments (which may physically span multiple physical data centers). For example, some virtual servers are physically located on hardware in a first physical data center, and other virtual servers are physically located in a second physical data center. In one example, the difference in physical location is irrelevant to the customer because the customer is presented an abstracted view of data center assets that span multiple virtualization control systems and multiple geographic locations.

In one embodiment, the above user interface enables a customer/user to add a network to a newly-created environment. The network is given a name and a VLAN identifier. The customer can create and place a new virtual server within the new environment. The customer can configure processing, memory, and storage resources to be associated with the new virtual server being created. The new server can then be deployed to the customer environment.

In one embodiment, the customer uses the user interface to perform configuration tasks for the new virtual server (e.g., providing a server name, selecting a number of processors to be associated with the virtual server, selecting an amount of system memory to be associated with the virtual server). The customer selects an operating system to associate with the new server.

In one embodiment, a customer can create groups of virtual servers. For example, customers can organize servers by function (e.g., a group of web servers, a group of SQL servers). The customer selects a particular virtual network (e.g., virtual network 121) to associate with the virtual server (e.g., a virtual machine running on server 107 or server 165), and then provides details of the IP address and DNS settings for the virtual server.

In one embodiment, after a customer purchases a block of IP addresses (e.g., associated with IP services 143), public IP addresses can be displayed in the user interface on client device 137. Another display screen can allow a user to examine assignments of private IPs to different virtual servers that have been configured.

In one embodiment, the user interface on client device 137 can be used to create an Internet service. The user selects a public IP address and a protocol. The user may then select a port value and a service name. A service description may be provided. A list of Internet services that have been provisioned for the IP address can be displayed in the interface. The provisioned services can include, for example, an FTP service, an SMTP service, etc. Within each service are listed the nodes (e.g., virtual servers) that have been created and associated with a particular Internet service, as well as the protocol and port.

In one example, switch configuration manager 127 can access the above customer environments (e.g., to add a network to a customer environment).

Figure 2:
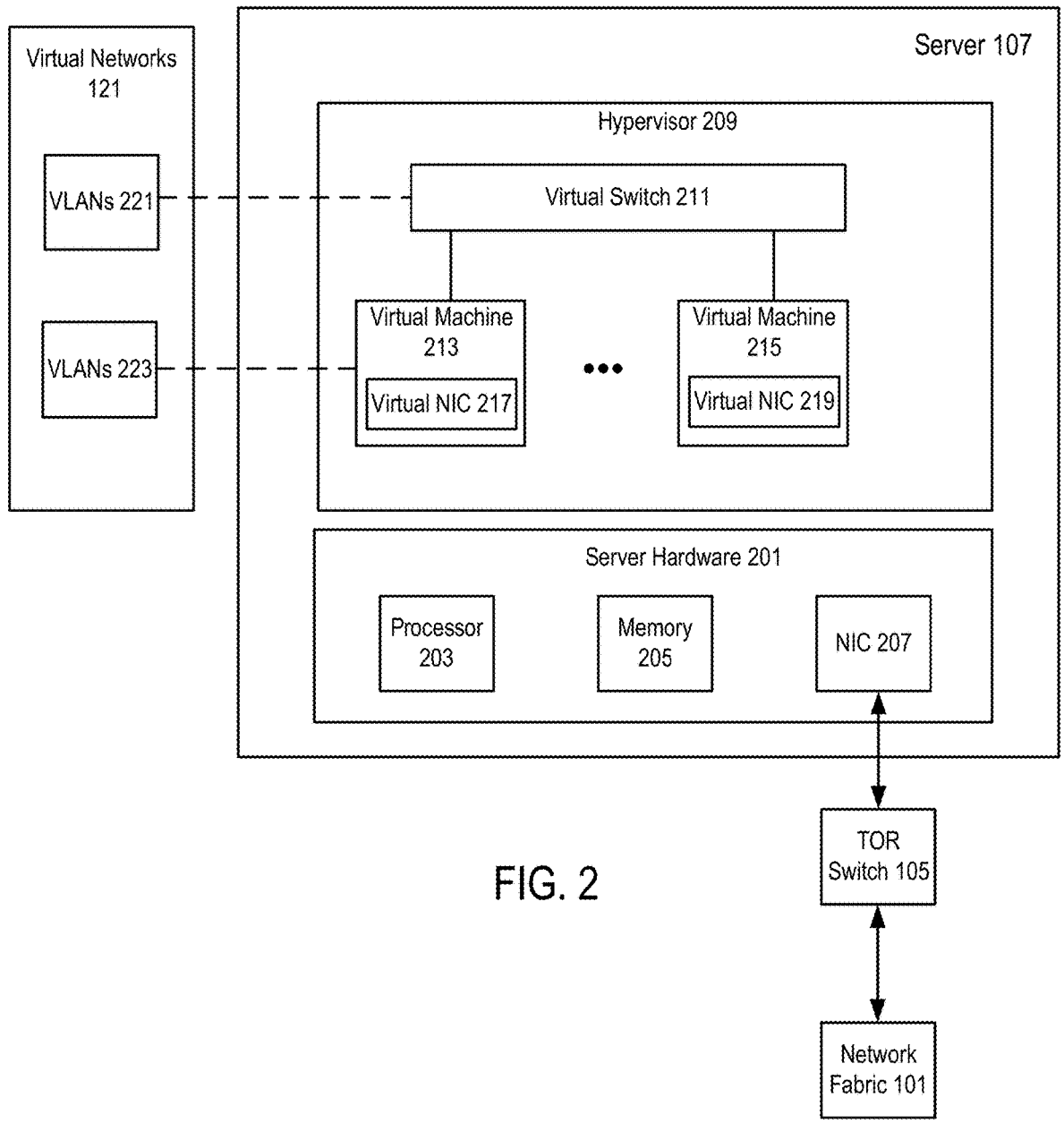
FIG. 2 shows an example server including server hardware executing a hypervisor that supports virtual machines, according to one embodiment.

FIG. 2 shows server 107 of FIG. 1, according to one embodiment. Server 107 includes server hardware 201 that executes a hypervisor 209. The hypervisor 209 supports virtual machines 213, 215. The server hardware 201 includes a processor 203, memory 205, and a network interface controller (NIC) 207. NIC 207 connects server 107 to a port of TOR switch 105. Another port of TOR switch 105 is connected to network fabric 101.

Virtual machines 213, 215 generally communicate with network fabric 101 using TOR switch 105. Virtual machine 213 has a virtual NIC 217, and virtual machine 215 has a virtual NIC 219. In one embodiment, virtual NICs 217, 219 connect virtual machines 213, 215 to one or more virtual networks 121 of network fabric 101. In one example, virtual machine 213 is associated with VLANs 223 of network fabric 101.

For example, VLANs 223 may have been created by a customer of the data center that itself has installed server 107 in rack 103. In one example, the customer installs server 107 after switch configuration manager 127 has configured one or more ports of TOR switch 105 in response to one or more communications from client device 137. In one example, a locking mechanism on rack 103 does not permit entry by the customer until this configuration of TOR switch 105 has been completed by switch configuration manager 127.

Hypervisor 209 also supports a virtual switch 211. Virtual machines 213, 215 are connected to ports of virtual switch 211. In one example, virtual switch 211 also has one or more ports associated with VLANs 221 of network fabric 101.

Figure 3:
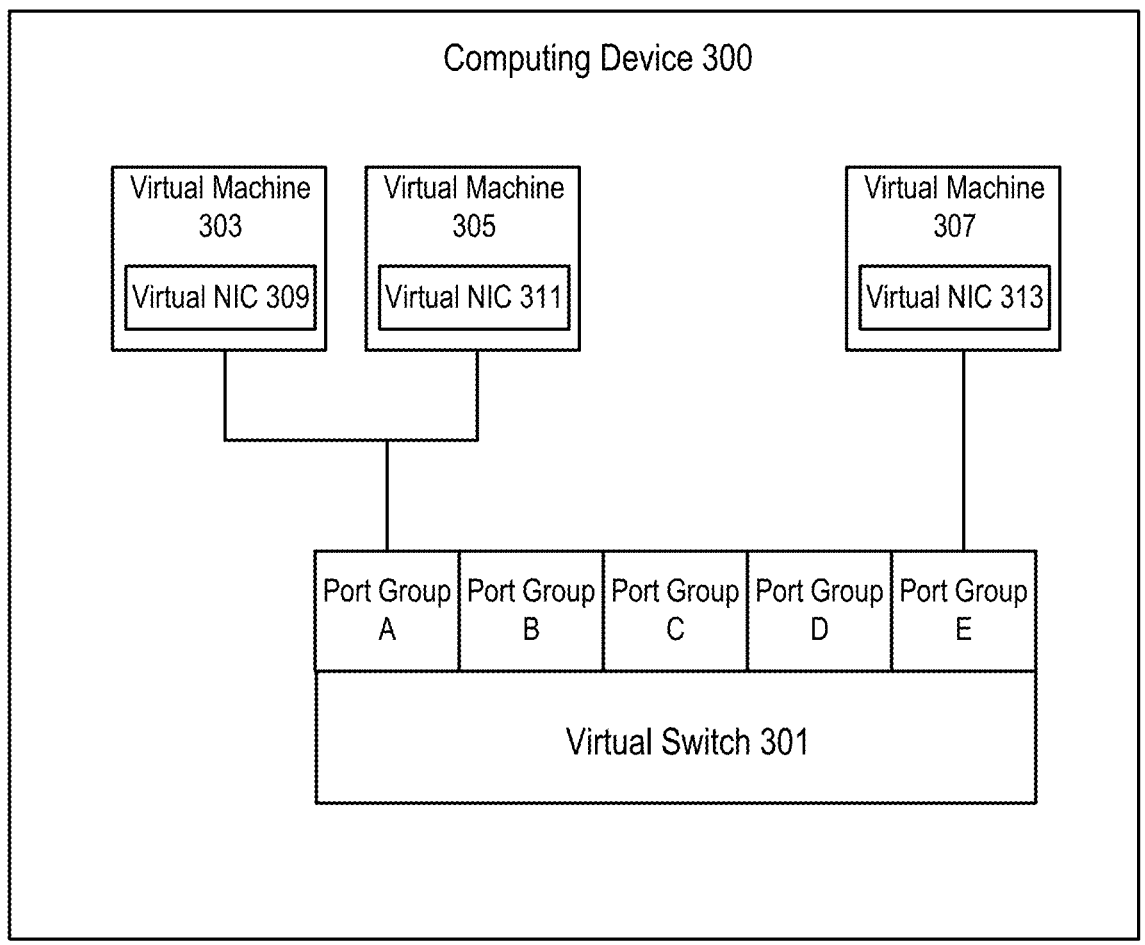
FIG. 3 shows an example computing device running virtual machines that connect to ports of a virtual switch, according to one embodiment.

FIG. 3 shows an example computing device 300 running virtual machines 303, 305, 307 that connect to various ports of a virtual switch 301, according to one embodiment. Computing device 300 is an example of server 107 of FIG. 2.

The ports of virtual switch 301 are provided in various groups (e.g., Port Group A, B, C, D, E). In one example, virtual machines 303, 305 are connected to Port Group A via virtual NICs 309, 311. Virtual machine 307 is connected to Port Group E via virtual NIC 313.

In one example, each port group corresponds to a virtual network. Virtual switch 300 is an example of virtual switch 211 of FIG. 2. In one example, each port group corresponds to one of VLANs 223 of FIG. 2.

In one case, computing device 300 is an example of computing device 125 of FIG. 1. Switch configuration manager 127 and/or internet configuration manager 129 can be implemented using virtual machines 303, 305, and/or 307. In one example, virtual machine 307 is used to implement portal 133 for communications with client device 137 using API 132.

In one embodiment, computing device 300 is used to implement compute services 151 of FIG. 1. For example, a customer can use client device 137 to request that one or more of virtual machines 303, 305, 307 be allocated to the customer's computing environment. In response to this request, one or more virtual networks of the customer's computing environment are connected to one or more of virtual machines 303, 305, 307. In one example, Port Group A corresponds to a group of virtual machines requested by the customer using client device 137. In one example, Port Group A corresponds to a group that is created in response to a customer request.

Figure 4:
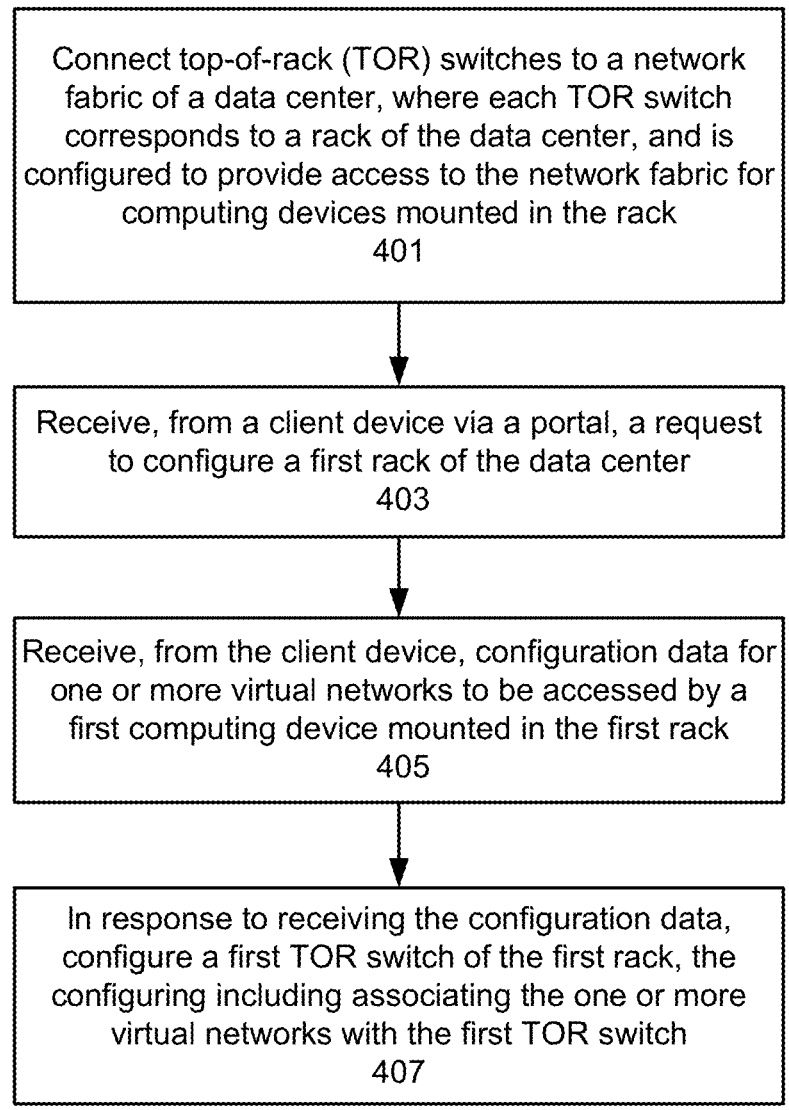
FIG. 4 shows a method for configuring a top-of-rack switch that is connected to a network fabric of a data center, according to one embodiment.

FIG. 4 shows a method for configuring a top-of-rack switch (e.g., TOR switch 105 of FIG. 1) that is connected to a network fabric (e.g., network fabric 101 of the data center of FIG. 1), according to one embodiment. For example, the method of FIG. 4 can be implemented in the system of FIGS. 1, 2, and 3.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 4 is performed at least in part by one or more processors of computing device 125 of FIG. 1. In one embodiment, computing device 125 is implemented using the processors and memory of FIG. 6 or 7 (see below).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, TOR switches are connected to a network fabric of a data center. Each TOR switch corresponds to a rack of the data center, and is configured to provide access to the network fabric for one or more computing devices mounted in the rack. In one example, the TOR switches are TOR switches 105 and 157 of FIG. 1, and the network fabric is network fabric 101. In one example, the computing devices mounted in the rack include router 113 and server 107, which are mounted by a customer after the rack has been assigned to the customer. This rack assignment occurs after the customer has requested the rack using client device 137.

At block 403, a request is received from a client device via a portal. The request is to configure a first rack of the data center. In one example, the client device is client device 137, and the portal is portal 133.

At block 405, configuration data is received from the client device. The configuration data is for one or more virtual networks to be accessed by a first computing device mounted in the first rack. In one example, the configuration data includes a specification of the devices and ports that a customer desires to connect to each of the virtual networks. In one example, the configuration data includes IP addresses associated with internet connectivity (e.g., provided by IP services 143). In one example, the configuration data includes a subnet mask and an identification of a gateway (e.g., for use in configuring a router). In one example, the virtual networks include virtual networks 121 and 123 of FIG. 1.

At block 407, in response to receiving the configuration data, a first TOR switch of the first rack is configured. This configuration includes associating the one or more virtual networks with the first TOR switch. In one example, switch configuration manager 127 configures TOR switch 105 of rack 103. This configuration includes associating virtual networks 121 with TOR switch 105.

In one embodiment, a method comprises: mounting a switch (e.g., TOR switch 105) in a rack (e.g., rack 103), wherein the rack is configured for mounting a server (e.g., server 107) connected to the switch; connecting the switch to a network fabric (e.g., network fabric 101); receiving, by a switch configuration manager (e.g., switch configuration manager 127) from a client device (e.g., client device 137), instructions to create a virtual network (e.g., one of virtual networks 121); in response to receiving the instructions, creating the virtual network; and configuring, by the switch configuration manager and based on the instructions, the switch to associate the virtual network with the switch.

In one embodiment, the method further comprises converting the virtual network into a virtual extensible local area network (e.g., one of VXLANs 142) for transmission of data from the server over the network fabric to a server mounted in a different rack.

In one embodiment, the rack is a first rack, the server is a first server, and the switch is a first switch. The method further comprises: receiving, by the switch configuration manager from the client device, instructions to associate the virtual network with a second server mounted in a second rack (e.g., rack 155); and in response to receiving the instructions to associate the virtual network with the second server, configuring a second switch (e.g., TOR switch 157) of the second rack to associate the VXLAN with the second switch.

In one embodiment, the virtual network is a first virtual network, and the method further comprises: receiving, from the client device, an instruction to create a second virtual network associated with the second server; and in response to receiving the instruction to create the second virtual network, configuring the network fabric to associate the second virtual network with the second server.

In one embodiment, the virtual network is a first virtual network, and the method further comprises: receiving, from the client device, an instruction to create a group including the first virtual network and a second virtual network; in response to receiving the instruction to create the group, storing data regarding the group in a data store (e.g., data store 131) that stores configuration data for switches in the network fabric; receiving, from the client device, an instruction to connect a virtual server to the group; and in response to receiving the instruction to connect the virtual server to the group, configuring at least one switch of the network fabric to associate the virtual server with the first virtual network and the second virtual network.

In one embodiment, the rack is a first rack in a first data center at a first geographic location, and the virtual network is a first virtual network. The method further comprises: receiving, from the client device, an instruction to create a second virtual network; in response to receiving the instruction to create the second virtual network, configuring the network fabric to create the second virtual network; receiving an instruction to create a group including the first virtual network and the second virtual network; in response to receiving the instruction to create the group, updating, by the switch configuration manager, a data store (e.g., data store 131) to track membership of the first virtual network and the second virtual network in the group; receiving, from the client device, an instruction to connect the group to a second rack in a second data center at a second geographic location; and in response to receiving the instruction to connect the group to the second rack, configuring the network fabric to associate the second virtual network with a switch of the second rack.

In one embodiment, a method comprises: connecting top-of-rack (TOR) switches to a network fabric of at least one data center (e.g., the data center of FIG. 1), wherein each TOR switch corresponds to a respective rack of the at least one data center, and is configured to provide access to the network fabric for computing devices mounted in the respective rack; receiving, from a client device via a portal (e.g., portal 133), a request to configure a first rack of the at least one data center; receiving, from the client device, configuration data for at least one first virtual network to be accessed by a first computing device mounted in the first rack; and in response to receiving the configuration data, configuring a first TOR switch of the first rack, the configuring including associating the at least one first virtual network with the first TOR switch.

In one embodiment, the computing devices are physical servers (e.g., server 107 of FIG. 2) configured to run virtual servers (e.g., virtual machines 213, 215), and the physical servers include a first physical server configured to run a first virtual server, the method further comprising configuring a virtual extensible local area network (VXLAN) of the network fabric to connect the first TOR switch to a second TOR switch of a second rack of the at least one data center, wherein the VXLAN is configured to transmit data from the first virtual server to a second virtual server running on a second physical server mounted in the second rack.

In one embodiment, each of the computing devices is a physical server, a network device, or a storage device; and the first TOR switch comprises at least one port, and configuring the first TOR switch comprises configuring the at least one port based on the configuration data.

In one embodiment, the first rack comprises a second TOR switch. A first port of the first TOR switch and a second port of the second TOR switch are configured for connection to the first computing device.

In one embodiment, the first TOR switch comprises a port, and configuring the first TOR switch comprises associating a virtual local area network (VLAN) with the port.

In one embodiment, the method further comprises: causing display, in a user interface of the client device, of an identifier for the first rack, and a geographic location of the first rack, wherein the identifier for the first rack is stored in a data store, and wherein the user interface enables a user to request that at least one virtual network be created in the network fabric; and storing, in the data store, a name and an identifier for each of the created at least one virtual network.

In one embodiment, the method further comprises causing display, in a user interface of the client device, of availability of ports for each of a plurality of geographic locations in which racks, including the first rack, are located, wherein each of the ports provides a connection to at least one of IP services (e.g., IP services 143) or compute services (e.g., compute services 151) over the network fabric.

In one embodiment, configuring the first TOR switch further includes providing access for the first computing device to the IP services or compute services.

In one embodiment, the client device generates the configuration data based on inputs received by a user interface of the client device. The inputs include selection of an icon in the user interface that corresponds to the first rack, and selection of the icon causes presentation in the user interface of configuration options for the first TOR switch.

In one embodiment, the first computing device has a port configured to connect to the at least one virtual network.

Figure 5:
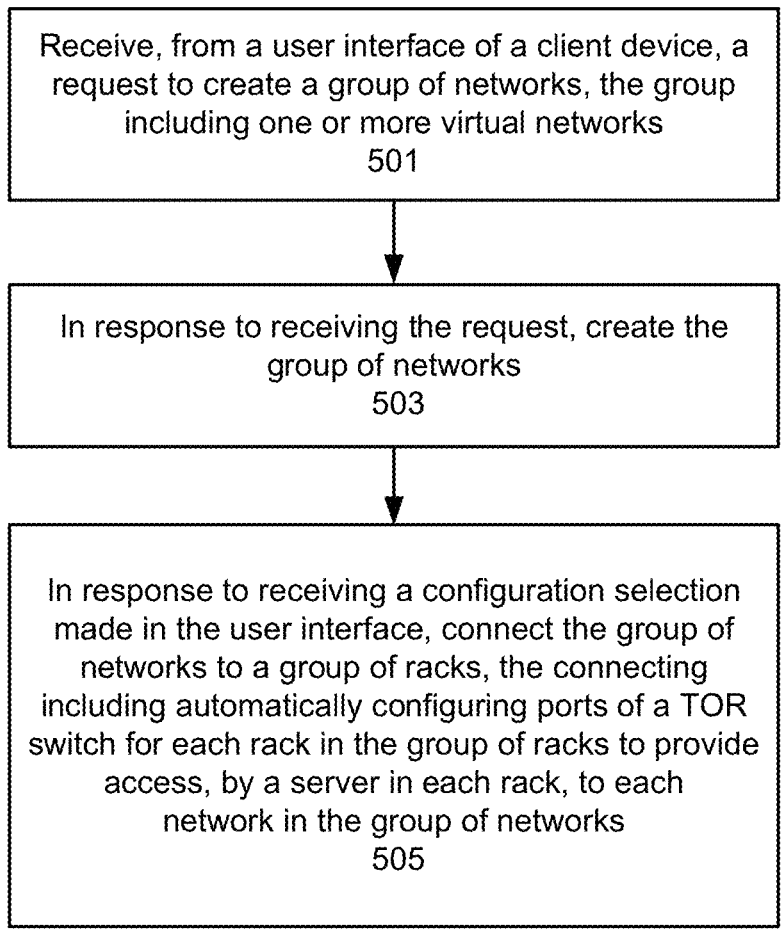
FIG. 5 shows a method for connecting a group of networks to a group of racks in response to a configuration selection received from a user by input into a user interface, according to one embodiment.

FIG. 5 shows a method for connecting a group of networks to a group of racks in response to a configuration selection received from a user by input into a user interface, according to one embodiment. For example, the method of FIG. 5 can be implemented in the system of FIGS. 1, 2, and 3.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 5 is performed at least in part by one or more processors of computing device 125 of FIG. 1. In one embodiment, computing device 125 is implemented using the processors and memory of FIG. 6 or 7 (see below).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, a request is received from a client device. The request is based on input provided into a user interface of the client device. The request is to create a group of networks, where the group includes one or more virtual networks. In one example, the client device is client device 137. In one example, the input is provided by a customer of the data center. The customer may provide a name which is assigned to the group.

At block 503, in response to receiving the request, the group of networks is created. In one example, the group of networks is created by switch configuration manager 127. The virtual networks that are assigned to the group are stored in data store 131.

At block 505, in response to receiving a configuration selection made in the user interface, the group of networks is connected to a group of racks. The connecting includes automatically configuring ports of a TOR switch for each rack in the group racks to provide access, by a server of each rack, to each network in the group of networks. In one example, the group of networks is connected to the group of racks by switch configuration manager 127. For example, network fabric 101 and TOR switches 105 and 157 are configured to connect each network of the group to racks 103 and 155. In one example, the group of networks includes virtual networks 121 and/or 123.

In one embodiment, a method comprises: receiving, by a switch configuration manager (e.g., switch configuration manager 127) from a client device (e.g., client device 137), instructions to create a virtual network (e.g., one of virtual networks 121); in response to receiving the instructions, creating the virtual network; and configuring, by the switch configuration manager and based on the instructions, a switch (e.g., TOR switch 105) to associate the virtual network with the switch.

In one embodiment, the virtual network is a first virtual network, and the method further comprises: receiving, from a user interface of the client device, a request to create a group of networks, the group including the first virtual network; in response to receiving the request, creating the group of networks; and in response to receiving a user selection made in the user interface, connecting the group of networks to a group of racks (e.g., racks 105 and 157), the connecting comprising automatically configuring ports of a TOR switch (e.g., TOR switches 105 and 157) for each rack in the group of racks to provide access, by a respective server in each rack, to each network (e.g., virtual networks 121) in the group of networks.

In one embodiment, a method comprises: receiving, over a network, a request to configure a first rack of at least one data center; receiving, over the network, configuration data for at least one first virtual network to be accessed by a first computing device mounted in the first rack; and in response to receiving the configuration data, configuring a first TOR switch of the first rack, the configuring including associating at least one first virtual network with the first TOR switch.

In one embodiment, the method further comprises: receiving, from a user interface of a client device, a request to create a group of networks, the group including the at least one virtual network; in response to receiving the request, creating the group of networks; and in response to receiving a configuration selection made in the user interface, connecting the group of networks to a group of racks, the connecting comprising automatically configuring ports of a TOR switch for each rack in the group of racks to provide access, by a respective server in each rack, to each network in the group of networks.

In one embodiment, a system comprises: a network fabric to transmit data in at least one data center, wherein the at least one data center includes racks for mounting servers connected to the network fabric; network switches (e.g., TOR switches 105, 157) connected to the network fabric, wherein each network switch corresponds to a respective one of the racks; a data store (e.g., data store 131) to store configuration data for the network switches; at least one processing device; and memory containing instructions configured to instruct the at least one processing device to: receive, via a portal from a client device, a request to create a computing environment supported on a plurality of racks (e.g., racks 103, 155) connected by the network fabric, the plurality of racks including a first rack for mounting a physical server configured to communicate with a physical server of a second rack in the computing environment; create at least one virtual network (e.g., virtual networks 121) in the computing environment; and configure at least one of the network switches to associate the at least one virtual network with the physical server.

In one embodiment, the instructions are further configured to instruct the at least one processing device to: receive, via a user interface of the client device, configuration selections associated with a new computing device in the computing environment; based on the configuration selections, configure processing resources, memory resources, and storage resources; and deploy the new computing device to the computing environment, wherein the new computing device is configured to run a virtual server connected to the at least one virtual network.

Figure 6:
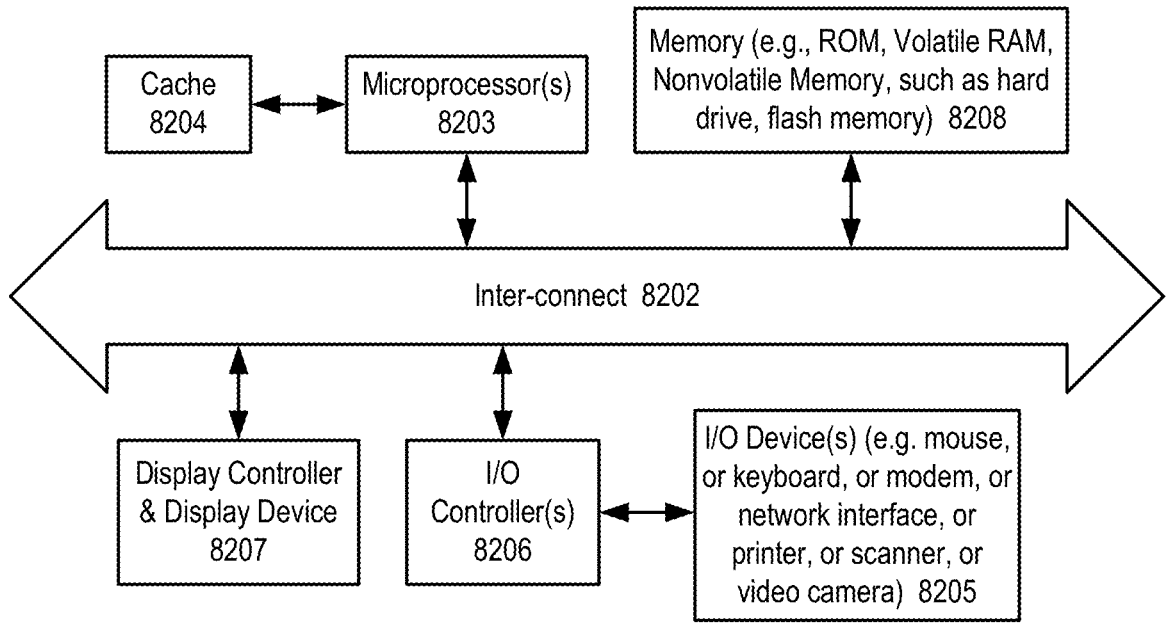
FIG. 6 shows a block diagram of a computing device, which can be used in various embodiments.

FIG. 6 shows a block diagram of a computing device, which can be used in various embodiments. While FIG. 6 illustrates various components, it is not intended to represent any particular architecture or manner of interconnecting the components. Other systems that have fewer or more components may also be used. In one embodiment, the computing device is a server. In one embodiment, several servers may be used and each reside on separate computing systems, or one or more may run on the same computing device, in various combinations.

In FIG. 6, computing device 8201 includes an interconnect 8202 (e.g., bus and system core logic), which interconnects a microprocessor(s) 8203 and memory 8208. The microprocessor 8203 is coupled to cache memory 8204 in the example of FIG. 6.

The inter-connect 8202 interconnects the microprocessor(s) 8203 and the memory 8208 together and also interconnects them to a display controller and display device 8207 and to peripheral devices such as input/output (I/O) devices 8205 through an input/output controller(s) 8206. Typical I/O devices include mice, keyboards, modems, network interfaces, printers, scanners, video cameras and other devices which are well known in the art.

The inter-connect 8202 may include one or more buses connected to one another through various bridges, controllers and/or adapters. In one embodiment the I/O controller 8206 includes a USB (Universal Serial Bus) adapter for controlling USB peripherals, and/or an IEEE-1394 bus adapter for controlling IEEE-1394 peripherals.

The memory 8208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a solid-state drive, magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 6 is used to implement computing device 115, computing device 125, TOR switch 105, server 107, and/or other servers.

In another embodiment, a computing device as illustrated in FIG. 6 is used to implement a user terminal or a mobile device on which an application is installed or being installed. A user terminal may be in the form of, for example, a laptop or notebook computer, or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 8203 and/or the memory 8208. For example, the functionalities described can be partially implemented via hardware logic in the microprocessor(s) 8203 and partially using the instructions stored in the memory 8208. Some embodiments are implemented using the microprocessor(s) 8203 without additional instructions stored in the memory 8208. Some embodiments are implemented using the instructions stored in the memory 8208 for execution by one or more general purpose microprocessor(s) 8203. Thus, the disclosure is not limited to a specific configuration of hardware and/or software.

Figure 7:
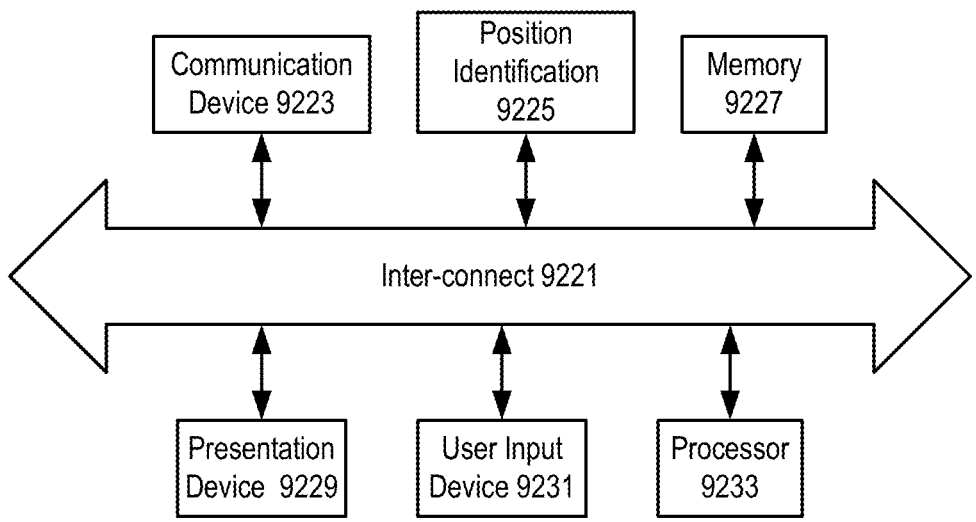
FIG. 7 shows a block diagram of a computing device, according to one embodiment.

FIG. 7 shows a block diagram of a computing device, according to one embodiment. In one embodiment, the computing device of FIG. 7 is used to implement client device 137. In FIG. 7, the computing device includes an inter-connect 9221 connecting the presentation device 9229, user input device 9231, a processor 9233, a memory 9227, a position identification unit 9225 and a communication device 9223.

In FIG. 7, the position identification unit 9225 is used to identify a geographic location. The position identification unit 9225 may include a satellite positioning system receiver, such as a Global Positioning System (GPS) receiver, to automatically identify the current position of the computing device.

In FIG. 7, the communication device 9223 is configured to communicate with a server to provide data, including configuration data and/or an image from a camera of the computing device. In one embodiment, the user input device 9231 is configured to receive or generate user data or content. The user input device 9231 may include a text input device, a still image camera, a video camera, and/or a sound recorder, etc.

Automated Deployment of Internet Connectivity

Various embodiments related to automating deployment of internet connectivity in a data center are now described below. The generality of the following description is not limited by the various embodiments described above.

Prior provisioning approaches for a colocation environment and network are time-consuming and manually intensive. The provisioning needs can include a need to integrate internet connectivity as part of the colocation network. The foregoing situation for prior provisioning approaches creates a technical problem in which time and expense are increased when adding internet connectivity, and the chance for error in configuration is increased. This can negatively impact the reliability of the colocation network operation.

Various embodiments described below provide a technological solution to one or more of the above technical problems. In one embodiment, a method includes receiving, from a client device (e.g., a customer that is installing and provisioning new equipment), a request to provide internet protocol (IP) services to at least one computing device mounted in one or more racks of a data center; assigning IP addresses corresponding to the IP services to be provided; creating a virtual network in a network fabric of the data center; in response to receiving the request, associating the virtual network with the assigned IP addresses; and configuring at least one top-of-rack (TOR) switch to connect at least one port of the TOR switch to the virtual network.

In one embodiment, a customer of a data center requests internet connectivity for its rack in the data center. The data center (e.g., using a software configuration manager executing on a server, or a controller of a software-defined network) creates a virtual network on the network fabric to provide the internet connectivity for the customer's rack. For example, the internet connectivity runs from a router of the data center to one or more switches (e.g., TOR switch) at the customer's rack. In one example, the internet connectivity is provided automatically in about 30 seconds after a request from the customer is received.

In one example, the request is received via a portal from a client device of the customer. In one example, the data center provides an application programming interface that is used by the client device to communicate configuration data regarding the internet connectivity. The configuration data can be used to configure one or more TOR switches of the customer's rack(s).

In one embodiment, a customer of the data center specifies a virtual network (e.g., a virtual local area network (VLAN)) to use. Data center automation software configures a network fabric of the data center to use the specified virtual network (e.g., VLAN). The data center automation software provides the customer with the IP addresses to use for the internet connectivity (and also provides the netmask and gateway data used for configuring the customer's router). The internet connectivity is carved by the data center automation software out of the overall data center IP address space.

In one embodiment, virtual extensible local area networks (VXLANs) are used in conjunction with switches and the network fabric of the data center. For example, a customer's existing VLANs are attached to a port of one of the switches in the customer's rack. The VLANs are converted into VXLANs. Data is sent to necessary destinations, then data is reconfigured back to customer-specified VLANs (this provides a tunneling mechanism in which the VLAN data is encapsulated inside of a VXLAN for transport). For example, this tunneling mechanism can be used for thousands of networks. Logical services are delivered to the switches at the customer's rack as virtual networks using the VXLANs.

Figure 8:
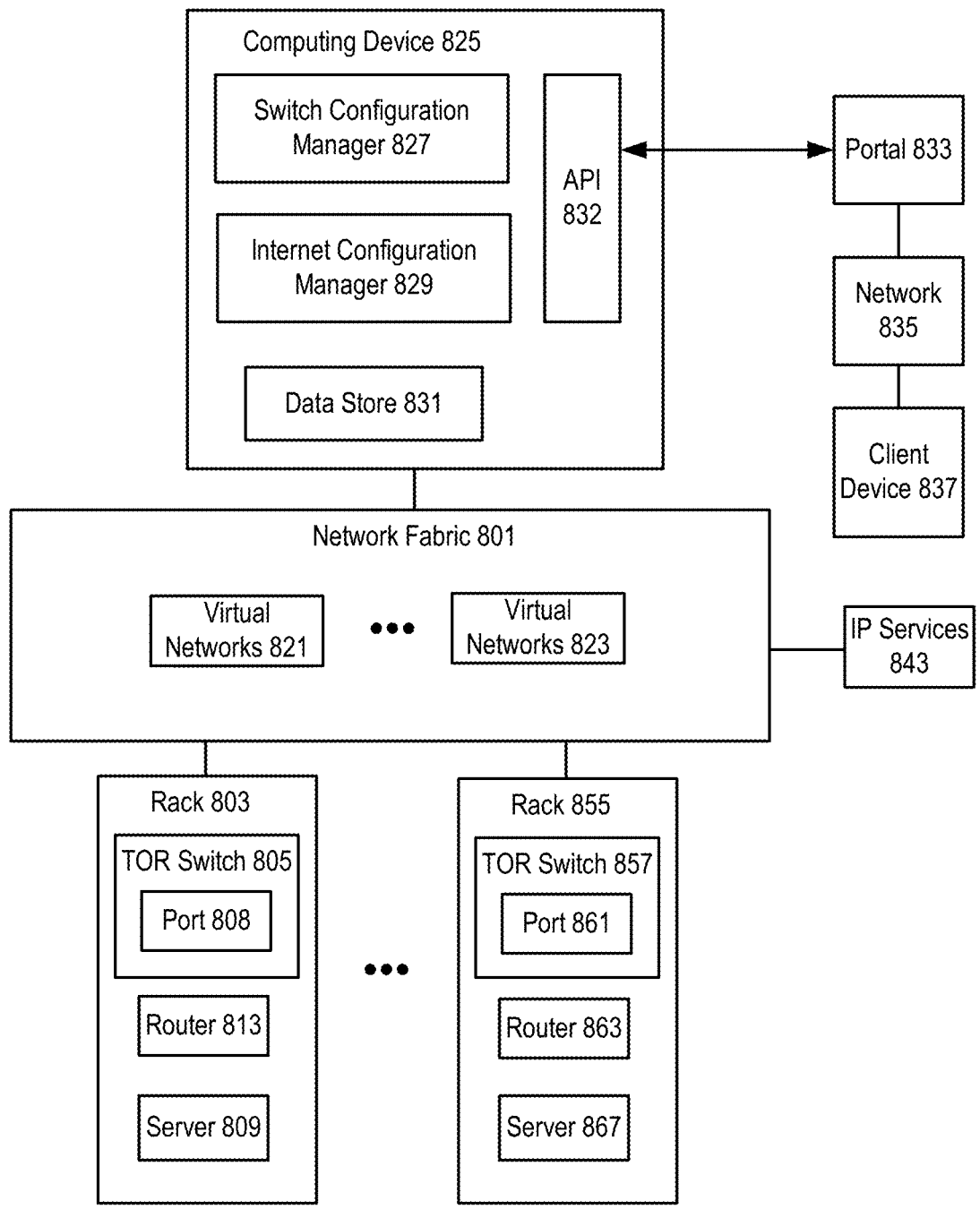
FIG. 8 shows an example data center including a network fabric that is configured to provide IP services to one or more racks in the data center, according to one embodiment.

FIG. 8 shows an example data center including a network fabric 801 that is configured to provide IP services to one or more racks in the data center, according to one embodiment. In one example, network fabric 801 is configured to connect IP services 843 to rack 803 and/or rack 855. In one example, IP services 843 includes a router that connects the network fabric 801 to one or more telecommunications carriers and/or network providers.

Computing device 125 of FIG. 1 is an example of computing device 825. Network fabric 101 is an example of network fabric 801. Racks 103, 155 are an example of racks 803, 855. IP services 143 is an example of IP services 843.

Computing device 825 includes an internet configuration manager 829 that receives configuration data from client device 837. Client device 837 communicates with computing device 825 using application programming interface 832. Portal 833 connects computing device 825 to client device 837 using network 835. In one example, network 835 includes a local area network, a wide area network, a wireless network, and/or the Internet.

Network fabric 801 includes virtual networks 821, 823. In response to receiving a request for internet connectivity from client device 837, virtual networks 821 and/or 823 are configured to connect IP services 843 to racks 803, 855. In one example, internet connectivity is provided to router 813 of rack 803 using TOR switch 805.

In one embodiment, switch configuration manager 827 configures TOR switch 805 so that port 808 connects to one or more virtual networks 821, 823. In some cases, one or more of virtual networks 821, 823 are created in response to a request by client device 837. In some cases, this request to create one or more virtual networks is associated with the request for internet connectivity from client device 837.

In one embodiment, switch configuration manager 827 alternatively and/or additionally configures TOR switch 857 so that port 861 connects to one or more virtual networks 821, 823. In some cases, the configuration of TOR switch 857 is performed as part of responding to the request for internet connectivity received from the client device 837 described above.

After configuration of TOR switches 803, 855, server 809 is connected to IP services 843 through router 813, and server 867 is connected to IP services 843 through router 863. In one embodiment, switch configuration manager 827 performs configuration of TOR switch 805 and/or 857 in response to a communication from internet configuration manager 829 after one or more virtual networks 821, 823 have been created as described above.

In one embodiment, data regarding available IP addresses of the data center (e.g., that can be used for connecting to IP services 843) is stored in data store 831. In response to the request for internet connectivity from client device 837, one or more IP addresses are allocated by internet configuration manager 829 for providing the requested internet connectivity. In one example, data store 831 stores records indicating allocated IP addresses associated with respective customers making requests for internet connectivity via their respective client devices. After internet connectivity is provided in response to a request, data store 831 is updated by internet configuration manager 829 to indicate the IP addresses newly-allocated for the internet connectivity.

Figure 9:
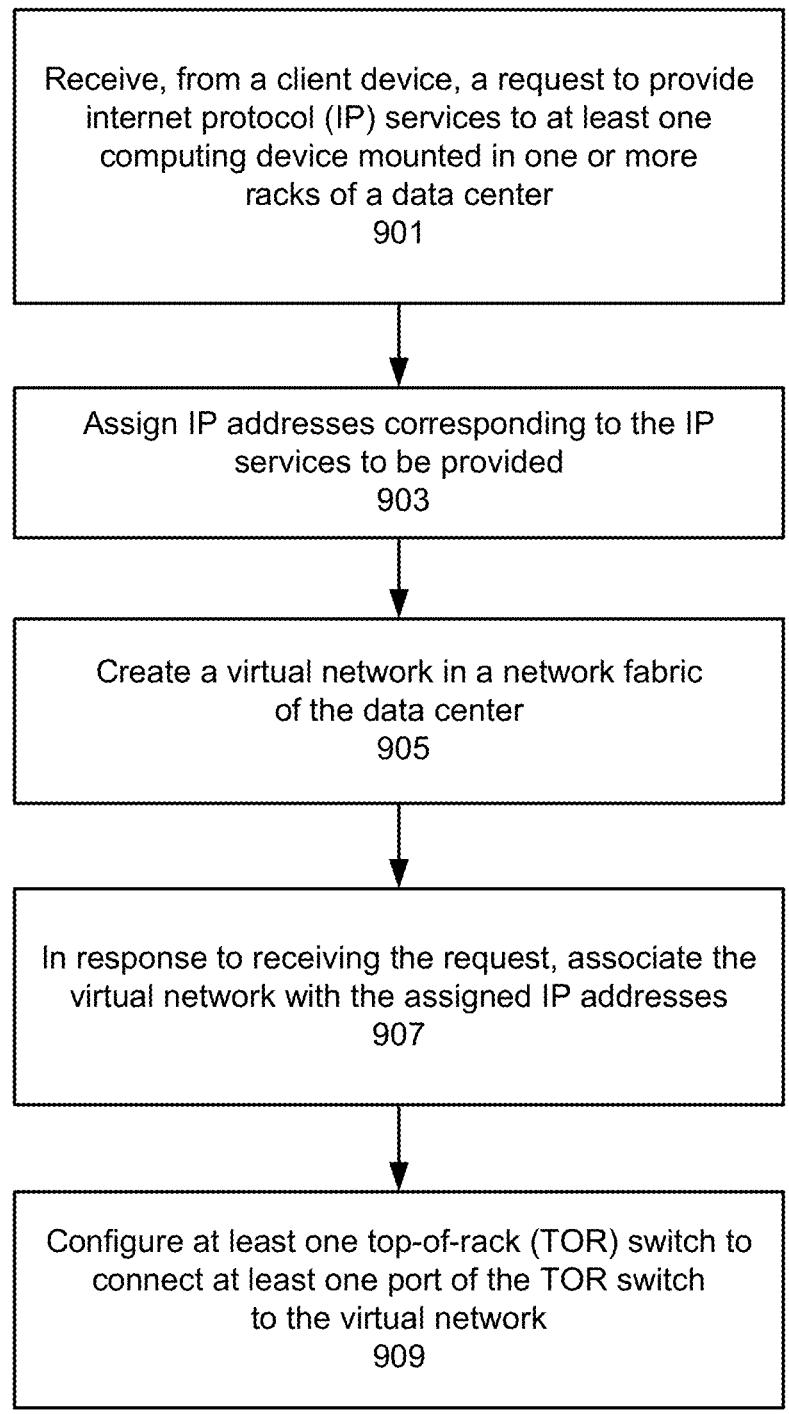
FIG. 9 shows a method for providing IP services to racks in a data center, according to one embodiment.

FIG. 9 shows a method for providing IP services to racks in a data center, according to one embodiment. For example, the method of FIG. 9 can be implemented in the system of FIGS. 1 and 8.

The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 9 is performed at least in part by one or more processors of computing device 825 of FIG. 8. In one embodiment, computing device 825 is implemented using the processors and memory of FIG. 6 or 7.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 901, a request is received from a client device to provide internet protocol (IP) services to at least one computing device mounted in one or more racks of the data center. In one example, the request is received from client device 837, and IP services 843 are provided to racks 803, 855 by configuring virtual networks 821, 823.

At block 903, IP addresses are assigned that correspond to the IP services to be provided in response to the request. In one example, internet configuration manager 829 queries data store 831 to determine available IP addresses for associating to the internet connectivity.

At block 905, a virtual network is created in a network fabric of the data center. In one example, the virtual network is created in response to the request from the client device. In one example, the virtual network is created prior to receipt of the request from the client device. In one example, virtual network 821 is created in network fabric 801.

At block 907, in response to receiving the request from the client device, the virtual network is associated with the assigned IP addresses. In one example, virtual network 821 is configured using the assigned IP addresses. In one example, virtual network 821 is configured to connect a router (e.g., that connects to external network providers) associated with IP services 843 to port 808 of TOR switch 805.

At block 909, one or more top-of-rack (TOR) switches are configured to connect one or more ports of each TOR switch to the created virtual network. In some cases, the ports are connected to one or more additional virtual networks that existed prior to receiving the request from the client device.

In one example, switch configuration manager 827 configures TOR switch 857 to connect port 861 to virtual network 821.

In one embodiment, a method comprises: configuring a top-of-rack (TOR) switch (e.g., TOR switch 803) for connection to a router (e.g., router 813) mounted in a rack of a data center; receiving, from a client device (e.g., client device 837) that provides network configuration data for computing devices mounted in the rack, a request for internet protocol (IP) network connectivity; in response to receiving the request, providing the IP network connectivity to the router including creating a virtual network on a network fabric (e.g., network fabric 801) of the data center, and connecting the router to the virtual network; and delivering, via the router, IP services (e.g., IP services 843) using the internet protocol (IP) network connectivity to a computing device (e.g., server 809) mounted in the rack.

In one embodiment, the network configuration data comprises configuration data for one or more virtual networks that connect, via the router, the computing devices to IP services provided by the data center.

In one embodiment, the virtual network is a virtual extensible local area network (VXLAN) of the network fabric.

In one embodiment, the router is a first router, providing the IP network connectivity further includes connecting the TOR switch to a second router (e.g., router 863) of the data center, and the second router provides IP network connectivity for a plurality of racks of the data center.

In one embodiment, the virtual network is specified by the client device, and providing the IP network connectivity further includes configuring the network fabric to use the specified virtual network.

In one embodiment, providing the IP network connectivity further includes providing IP addresses used to configure the router for providing the IP services.

In one embodiment, the client device is a first client device, and providing the IP addresses includes communicating the IP addresses to the first client device. The method further comprises: allocating a first IP address space corresponding to the request from the first client device; and allocating a second IP address space corresponding to a request for IP services received from a second client device.

In one embodiment, the method further comprises: allocating a subnet from an IP address space of the network fabric; and specifying a gateway for configuring the router, wherein the subnet routes to the virtual network.

In one embodiment, data regarding the subnet and gateway is communicated, via a portal, to the client device, and the IP services include at least one of providing a firewall or implementing a virtual private network (VPN).

In one embodiment, the network fabric is implemented using a software-defined network comprising a control layer overlayed onto an infrastructure layer, wherein the control layer manages network services including the IP services, and wherein the infrastructure layer comprises hardware or software switches, and hardware or software routers.

In one embodiment, a controller manages the control layer including creating the virtual network on the network fabric.

In one embodiment, the method further comprises receiving, from the client device, a policy, and implementing, by the controller, the policy in the control layer so that the IP services are in compliance with the policy.

In one embodiment, the method further comprises: maintaining, in memory of the data center (e.g., using records in data store 831), configuration data regarding an available IP address space of the data center for providing the IP network connectivity; wherein providing the IP network connectivity to the router further includes selecting a portion of the available IP address space.

In one embodiment, providing the IP network connectivity to the router further includes configuring the TOR switch to provide access for the computing devices to the IP services.

In one embodiment, the virtual network is a first virtual network, the TOR switch is a first TOR switch (e.g., TOR switch 805), and the computing devices are first physical servers configured to run virtual servers including a first virtual server. The method further comprises: in response to the request from the client device, providing IP network connectivity, via a second TOR switch (e.g., TOR switch 857), to a second rack of the data center to provide access for second physical servers to IP services; and configuring a second virtual network of the network fabric to connect the first TOR switch to the second TOR switch. The second virtual network is configured to transmit data from the first virtual server to a second virtual server running on the second rack.

In one embodiment, the method further comprises communicating the network configuration data to a switch configuration manager of the data center for use in configuring the TOR switch.

In one embodiment, a method comprises: storing, in a data store (e.g., data store 831), configuration data regarding a plurality of computing devices that are provided internet protocol (IP) network connectivity by configuring a network fabric of a data center, wherein the configuration data includes available IP addresses of the data center; receiving, from a client device, a request for allocation of a portion of the IP addresses for one or more racks of the data center, wherein the IP connectivity is provided for use by at least one server mounted in the one or more racks; in response to receiving the request, providing the IP network connectivity in order to deliver IP services for the one or more racks, wherein providing the IP network connectivity includes configuring the network fabric using IP addresses assigned from the available IP addresses; configuring a first top-of-rack (TOR) switch of a first rack to connect the at least one server to the IP services; and updating the configuration data to indicate that the assigned IP addresses are associated with the one or more racks.

In one embodiment, the method further comprises communicating, by an internet configuration manager (e.g., manager 829), the configuration data to a switch configuration manager for use in configuring the TOR switch.

In one embodiment, the first TOR switch and a second TOR switch of a second rack are each configured to provide the IP network connectivity using at least a portion of the assigned IP addresses.

In one embodiment, a system comprises: at least one processing device; and memory containing instructions configured to instruct the at least one processing device to: receive, from a client device, a request to provide internet protocol (IP) services to at least one computing device mounted in one or more racks of a data center; assign IP addresses corresponding to the IP services to be provided; create a virtual network in a network fabric of the data center; in response to receiving the request, associate the virtual network with the assigned IP addresses; and configure at least one top-of-rack (TOR) switch to connect at least one port of the TOR switch to the virtual network.

In one embodiment, rack 803 and rack 855 are each connected to network fabric 801 using a physical fiber port (e.g., physical fiber port 104, 153). A customer that controls racks 803 and 855 requests the creation of one or more IP network connectivity instances, with each instance being associated with a respective virtual local area network (VLAN). Each VLAN will appear on the network equipment of the customer. Each VLAN is connected to the physical fiber port so that the VLAN can be used, for example, for Internet access. In one embodiment, various virtual networks of network fabric 801 are configured to provide the Internet access. However, one or more of these virtual networks are hidden from the customer. Each VLAN connected to the physical fiber port is exposed to the customer.

In one embodiment, the operator of the data center obtains connectivity from one or more upstream connectivity providers. The operator runs the routing protocols and owns the corresponding IP address space. The customer makes a request for IP connectivity, and a size of a subnet of the IP address space allocated to the customer is determined based at least in part on the number of public IP addresses desired by the customer. The customer can also specify a rate limit (e.g., 1 Gb/sec) for the IP network connectivity. In one example, the subnet is allocated to the customer and routes to the customer's VLAN. A router or another network device in the rack of the customer terminates as part of the VLAN. The customer can route traffic using the data center and can use the public IP addresses. In one example, the public IP addresses are used for firewalls and/or load balancers.

In one embodiment, various virtual networks are connected to computing resources assigned for use by a customer. For example, in response to communications received from client device 837, one or more networks can be connected to processing and/or storage resources. In one example, the virtual networks are connected to the physical fiber port of one or more racks of the customer.

In one embodiment, a data center is administered using computing device 825. An administrator of computing device 825 can be provided visibility for all networks that have been created by customers and/or otherwise created on network fabric 801. In one embodiment, for each IP network connectivity instance, the administrator is provided visibility to the computing resources of the data center that are used to support the instance. In one example, routing instances are visible to the administrator. In one example, the administrator is provided visibility to all subnets that have been allocated to customers as IP network connectivity has been provided. The administrator can also see and identify those customers that have been assigned particular IP address space(s), which permits management of the capacity of the total public IP address space of the data center.

In one embodiment, equipment of the customer is mounted in rack 803 and rack 855. Using API 832, client device 837 provides instructions that are used to program the network fabric 801 so that multiple virtual networks can be created. In one example, these virtual networks can be used to connect server 809 to server 867. In one example, switch configuration manager 827 connects ports 808 and 861 to these virtual networks. In one example, racks 803 and 855 are each located in data centers at a different geographic location (e.g., the data centers are greater than 1,000 to 5,000 meters apart).

In one embodiment, virtual networks created for a customer using client device 837 can be associated with a particular group of networks. The associations of virtual networks to respective groups of networks can be stored in data store 831.

In one embodiment, the customer has a server connected to various ports on multiple switches. The customer can use portal 833 to select one of the switches and to specify a virtual network to associate with a particular identified port of the selected switch. In one embodiment, the customer can create a group of virtual networks and specify that one or more specified virtual networks are to be bound to the particular identified port. In response to one or more request(s) received from client device 837, switch configuration manager 827 configures the selected switch so that the specified virtual network is bound to the particular identified port.

Automated Access to Racks in a Colocation Data Center

Various embodiments related to configuring networks and/or controlling access to switches or other computing devices in a data center are now described below. The generality of the following description is not limited by the various embodiments described above.

In one embodiment, racks in a data center are equipped with top-of-rack (TOR) switches and cabled into the data center network fabric (e.g., implemented using a software-defined network fabric) prior to a customer's arrival at the data center (e.g., arrival to install new servers or other equipment in a rack). In one example, the network fabric includes secure layer 2 network connectivity throughout one or more data centers (e.g., data centers in the same or different metro regions). In one example, a customer racks and cables its servers to the TOR switches, and then uses an API or portal to configure an internet connection and the switches for the new servers (e.g., a customer can use this approach for any number of racks). The customer can specify a selection of networks to work with the servers. Then, the switches and the network fabric are automatically configured by the data center to implement the customer selection.

In one embodiment, a customer installs its servers, and then cables the servers to the TOR switches (and/or to other switches or routers in the rack). The customer uses a portal to configure network ports for the switches. In one example, the customer has a server plugged into port 1 on two TOR switches for a rack. The customer uses the portal to select one of the switches, and then users a user interface of a client device to go to a screen for port 1, at which the customer specifies that VLAN 100 is bound to that particular port 1. Using the user interface, the customer can also create a group of VLANs and specify that the group is bound to that port 1. Data center automation software then automatically configures the TOR switches so that VLAN 100 is associated with the requested port 1. In some cases, this process is applied across multiple racks simultaneously.

In one embodiment, a customer uploads a photo or other image data to the data center (e.g., using a customer portal) prior to arrival at the data center. The photo is used as part of a security process to control physical access by the customer to its racks in the data center. This process can also include configuring a locking mechanism (e.g., a lock on a door to a rack and/or to door to a room in which the rack is located) that allows customer access to its racks. Security personnel at the data center can provide the customer with a badge (that incorporates the photo or other image data). The badge enables the customer to enter the data center facility and unlock its racks.

In one embodiment, a customer is added to an authentication service used by the data center. The authentication service manages access by and identifies the customer. The customer logs into a command center of the data center (e.g., the command center can be implemented by software that includes the switch configuration manager 127 of FIG. 1). In one example, a client device (e.g., client device 837 of FIG. 8) of the customer sends authentication credentials to the authentication service. In one example, physical access to one or more racks of the customer requires successful authentication by the authentication service.

Next, the command center can perform various actions. The command center maintains a database of available rack inventory. In response to a customer selection in the user interface of a client device, the command center allocates racks from available inventory in the location selected by the customer. The authentication service is updated with rack assignment information corresponding to these allocated racks. In one embodiment, database records including the rack assignment information are accessed and used as a basis for configuring physical access by a customer.

A security system at each physical data center facility where the selected racks are located is updated so that the customer is allowed to physically access the racks. For example, one or more doors that permit entry into a physical facility and/or movement through doors inside the facility can be unlocked so that the customer is able to enter the data center and access its racks. A lock system used on the racks is configured to allow the customer to access the selected racks. For example, the lock can be a physical-keyed lock, a magnetic lock, or a combination of physical and/or electronic locking mechanisms. In some cases, IP connectivity (e.g., to provide internet access) is provisioned and connected to the TOR switches for the selected racks. In one example, IP connectivity is provided by IP services 843 of FIG. 8.

After the command center performs the actions above, the customer can perform various further actions. First, the customer accesses the command center to complete user setup, including uploading the photo or image data via the portal (e.g., portal 833 of FIG. 8). In one example, the client device is a mobile device having a camera and is used to take a photo of personnel associated with the customer. The photo is uploaded to the command center via the API (e.g., API 832) above.

When the customer physically arrives at a data center location, the customer can check in with security personnel to receive a security badge or token. The badge can include the photo previously provided by the customer above. The customer enters the facility and unlocks the selected racks using the badge. In one example, the badge contains authentication credentials necessary to unlock the locking mechanism on the selected racks. The customer installs computing equipment in the selected racks, and then cables the equipment to the TOR switches above (e.g., TOR switches 805, 857). The customer then accesses the command center and configures ports of the TOR switches. In one example, the switch ports are configured with a virtual local area network (VLAN) configuration desired for use by the customer.

Figure 10:
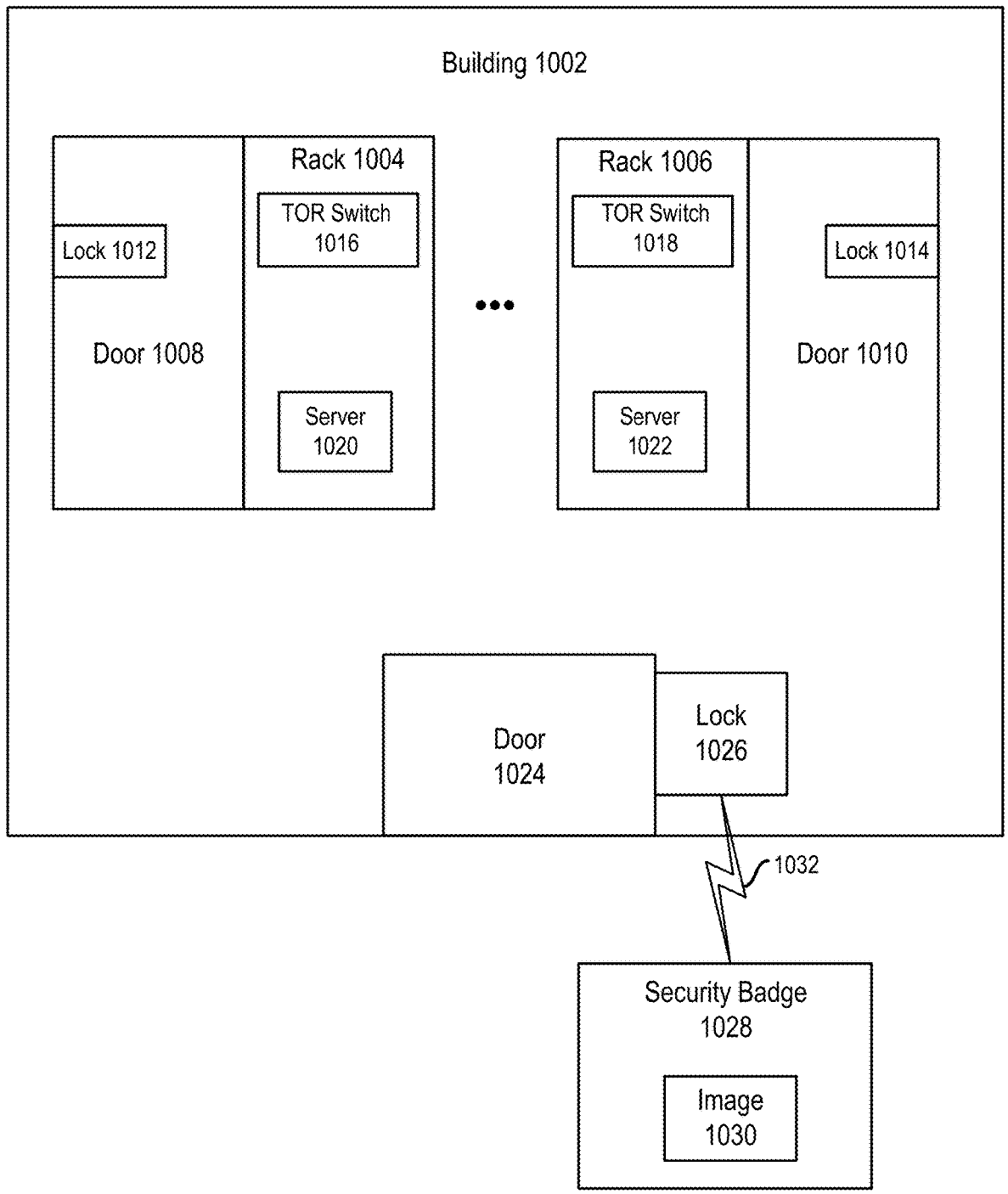
FIG. 10 shows an example building that houses racks of a data center and uses doors and locks to control access to the racks, according to one embodiment.

FIG. 10 shows an example building 1002 that houses racks 1004, 1006 of a data center and uses doors and locks to control access to the racks, according to one embodiment. Rack 1004 has a TOR switch 1016, and rack 1006 has a TOR switch 1018. TOR switches 1016 and 1018 are configured, such as described above, to connect servers 1020, 1022 to a network fabric of the data center.

Lock 1012 physically secures door 1008 of rack 1004. Lock 1014 physically secures door 1010 of rack 1006. Lock 1012 and/or lock 1014 are released or unlocked in response to successful authentication of a customer. In one example, the customer authenticates itself using a security token or badge. In one example, the security badge is security badge 1028 which includes image 1030. In one example, the customer authenticates itself using the client device that was used to provide configuration data for TOR switch 1016 and/or 1018.

A door 1024 controls interior access to building 1002 by persons on the exterior of building 1002 that desire entry. Lock 1026 physically locks door 1024. In one embodiment, security badge 1028 communicates with lock 1026 over a wireless link 1032. Lock 1026 is unlocked in response to successful authentication of security badge 1028 by processing logic associated with lock 1026, and/or a computing device associated with the data center.

In one embodiment, command center software communicates with lock 1012, 1014, and/or 1026 to provide physical access to one or more racks by a customer. In one embodiment, switch configuration manager 127 of FIG. 1 monitors and/or receives data regarding the physical presence of customer personnel in a data center. In one example, switch configuration manager 127 receives data regarding the physical presence of personnel inside one or more identified racks (e.g., a hand inside a cage of a rack as determined by a camera of the rack). In one example, switch configuration manager 127 delays TOR switch configuration for a rack until data is received indicating that personnel are no longer physically present in the rack (e.g., image detection software determines that no movement has occurred in a predetermined time period). In one example, TOR switch configuration is postponed until data is received by switch configuration manager 127 that indicates that the rack is physically secure (e.g., physical access to the rack is closed off by one or more locks being engaged).

In one example, TOR switch 1016 connects to network interface controller ports of server 1020 for downlink communications and to spine switches of the data center for uplink communications. In one example, an API is used to manage TOR switch 1016. In one example, the API is accessed by server 1020 and/or a client device located externally to rack 1004 for performing network configuration associated with a rack being physically accessed.

Figure 11:
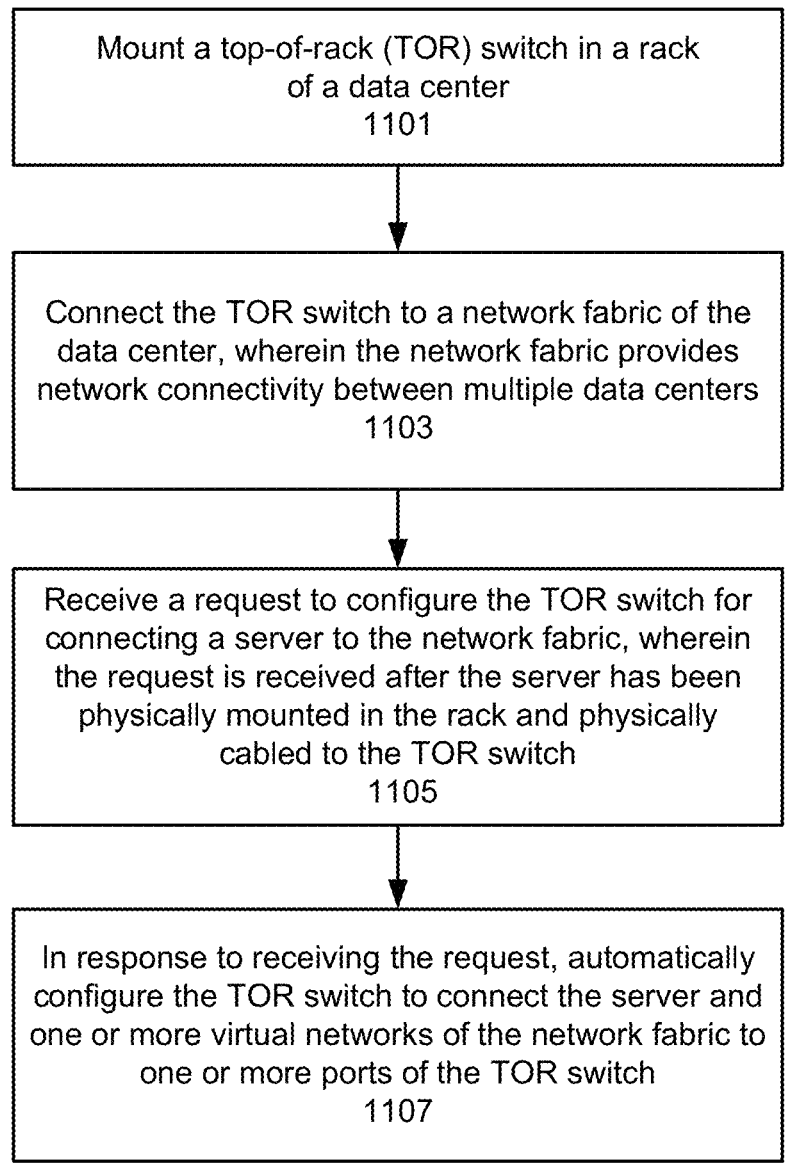
FIG. 11 shows a method for configuring a TOR switch to connect a server and virtual networks of a network fabric to one or more ports of the TOR switch, according to one embodiment.

FIG. 11 shows a method for configuring a TOR switch to connect a server and virtual networks of a network fabric to one or more ports of the TOR switch, according to one embodiment. For example, the method of FIG. 11 can be implemented in the system of FIGS. 1 and 8 for a data center located in building 1002 of FIG. 10.

The method of FIG. 11 can be performed at least in part by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 11 is performed at least in part by one or more processors of computing device 825 of FIG. 8. In one embodiment, computing device 825 is implemented using the processors and memory of FIG. 6 or 7.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1101, a top-of-rack (TOR) switch is mounted in a rack of a data center. For example, TOR switch 1016 is mounted in rack 1004.

At block 1103, the TOR switch is connected to a network fabric of the data center. The network fabric provides network connectivity between multiple data centers. For example, TOR switch 1016 is connected to network fabric 101 of FIG. 1.

At block 1105, a request is received to configure the TOR switch for connecting a server to the network fabric. The request is received after the server has been physically mounted in the rack and physically cabled to the TOR switch. For example, the request is received from client device 837 of a customer after the customer has physically mounted and cabled server 1020 to TOR switch 1016.

At block 1107, in response to receiving the request, the TOR switch is automatically configured to connect to the server and one or more virtual networks of the network fabric to one or more ports of the TOR switch. For example, the TOR switch is configured by switch configuration manager 127 of FIG. 1 to connect the server and virtual networks 121, 123 to the ports of the TOR switch.

In one embodiment, a method comprises: mounting a top-of-rack (TOR) switch (e.g., TOR switch 1016) in a rack (e.g., rack 1004) of a first data center (e.g., a data center enclosed by building 1002); connecting, using physical fiber (e.g., physical fiber port 104 of FIG. 1), the TOR switch to a network fabric (e.g., network fabric 101 of FIG. 1) of the data center, wherein the network fabric provides network connectivity between a plurality of data centers including the first data center; receiving, from a client device, a request to configure the TOR switch for connecting a server to the network fabric, wherein the request is received after the server has been physically mounted in the rack and physically cabled to the TOR switch; and in response to receiving the request, automatically configuring the TOR switch to connect each of the server and one or more virtual networks of the network fabric to one or more ports of the TOR switch.

In one embodiment, the network connectivity is layer 2 connectivity.

In one embodiment, the layer 2 connectivity is implemented between the data centers using a plurality of virtual extensible local area networks (VXLANs).

In one embodiment, the request comprises a request to provide an internet connection for the server, and the method further comprises automatically configuring the TOR switch to provide internet connectivity to the server via one or more virtual networks of the network fabric.

In one embodiment, providing the internet connectivity comprises connecting the server to a carrier (e.g., carriers 145 of FIG. 1) or internet service provider via a router of the network fabric.

In one embodiment, the server is connected to a first port of the TOR switch, wherein an indication is received from the client device that specifies a first virtual network to be bound to the first port, and wherein configuring the TOR switch includes connecting the first port to the first virtual network.

In one embodiment, the method further comprises receiving, from the client device, a request to create a network group that includes a plurality of virtual networks including the first virtual network.

In one embodiment, the method further comprises: receiving, from the client device, a request to bind the network group to the first port; and in response to receiving the request to bind the network group, configuring the TOR switch to connect each of the plurality of virtual networks to the first port.

In one embodiment, the TOR switch is a first switch and the rack is a first rack, and the method further comprises, in response to receiving the request to bind the network group, automatically configuring a second TOR switch of a second rack to connect at least one of the plurality of virtual networks to a second port of the second TOR switch.

Figure 12:
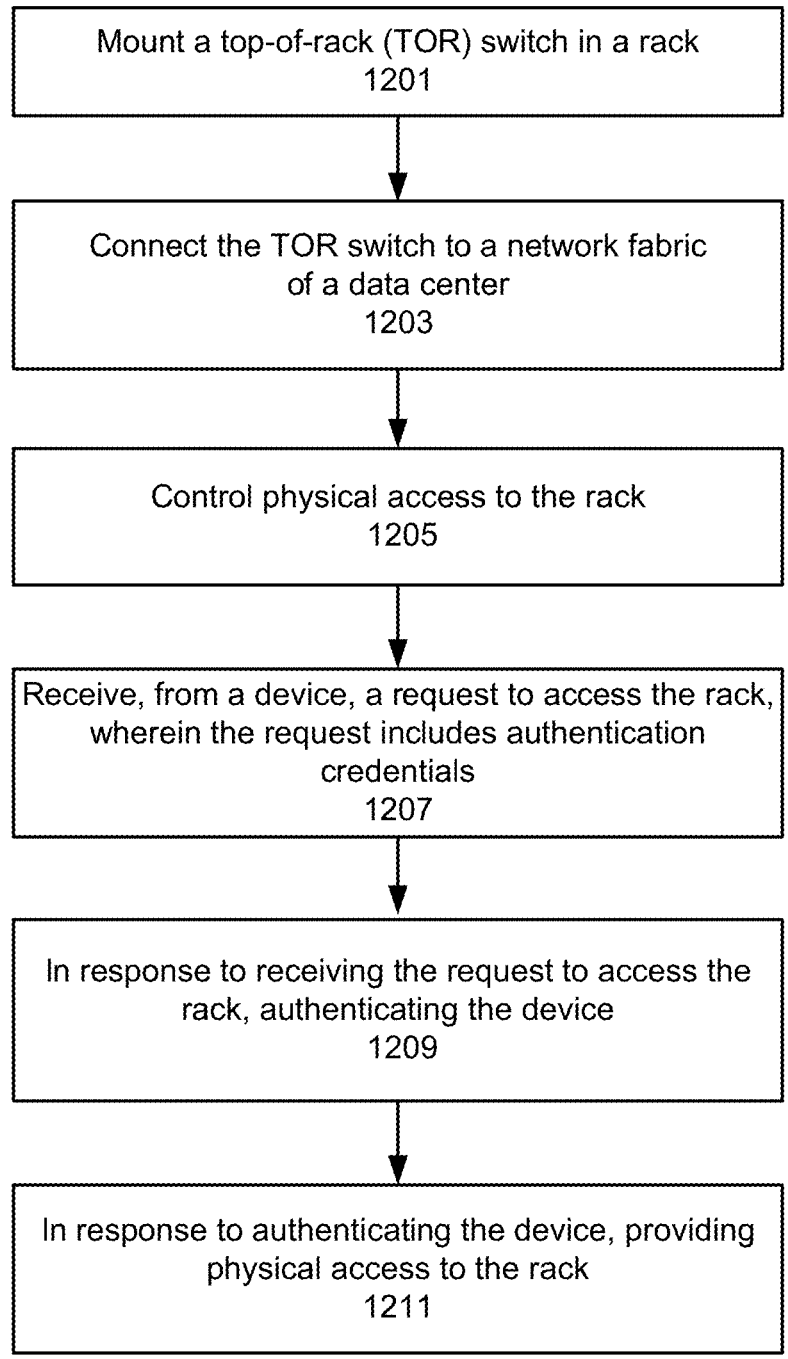
FIG. 12 shows a method for controlling physical access to a rack in a data center, according to one embodiment.

FIG. 12 shows a method for controlling physical access to a rack in a data center, according to one embodiment. For example, the method of FIG. 12 can be implemented in the system of FIGS. 1 and 8 (e.g., for a data center located in building 1002 of FIG. 10).

The method of FIG. 12 can be performed at least in part by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 12 is performed at least in part by one or more processors of computing device 825 of FIG. 8. In one embodiment, computing device 825 is implemented using the processors and memory of FIG. 6 or 7.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1201, a TOR switch is mounted in a rack. For example, TOR switch 1018 is mounted in rack 1006.

At block 1203, the TOR switch is connected to a network fabric of the data center. For example, TOR switch 1018 is connected to network fabric 101.

At block 1205, physical access to the rack is controlled. In one example, physical access to the rack is controlled using lock 1012 on door 1008.

At block 1207, a request to physically access the rack is received from a device. The request includes authentication credentials. In one example, the request to access the rack is received from security badge 1028. The request is for access to the rack in building 1002 via entry by door 1024. In one example, the request to access the rack is received from client device 137 or another computing device.

At block 1209, in response to receiving the request to access the rack, the device is authenticated. In one example, authentication credentials provided by security badge 1028 are authenticated.

At block 1211, in response to authenticating the device, physical access to the rack is provided. In one example, in response to authenticating security badge 1028, lock 1026 is unlocked so that door 1024 can be opened by a person wearing security badge 1028.

In one embodiment, a method comprises: mounting a top-of-rack (TOR) switch in a rack; connecting the TOR switch to a network fabric of a first data center; controlling, using a lock (e.g., lock 1026), physical access to the rack; receiving, from a computing device (e.g., a client device, a security token, etc.), a request to access the rack, wherein the request includes authentication credentials; in response to receiving the request to access the rack, authenticating the computing device; and in response to authenticating the computing device, configuring the lock to provide the physical access to the rack.

In one embodiment, connecting the TOR switch to the network fabric is performed prior to configuring the lock to provide the physical access to the rack.

In one embodiment, receiving the request to access the rack further includes receiving the authentication credentials from a security token or badge, and the method further comprises: in response to authenticating the computing device, releasing the lock.

In one embodiment, the method further comprises: receiving image data for an image of a person to be provided access to the rack; and providing, using the received image data, a display of the image on the security token or badge. In one example, image 1030 is displayed on security badge 1028.

In one embodiment, the request to access the rack and the data regarding the image are each received from a client device over a portal.

In one embodiment, the method further comprises causing a display in a user interface of the client device, the display presenting available internet connectivity in each of a plurality of data centers including the first data center.

In one embodiment, configuring the lock to provide the physical access to the rack includes providing access for physical installation of at least one computing device that logically connects to a network port of the TOR switch.

In one embodiment, the method further comprises: in response to authenticating the computing device, unlocking a first door of a building (e.g., door 1024 of building 1002) that houses the first data center, wherein unlocking the first door permits physical entry by a person into the building; wherein the lock secures a second door (e.g., door 1008) of the rack, and configuring the lock to provide the physical access to the rack includes unlocking the second door.

In one embodiment, a system comprises: at least one processing device; and memory containing instructions configured to instruct the at least one processing device to: mount a top-of-rack (TOR) switch in a rack of a data center; connect the TOR switch to a network fabric of the data center; receive, over a network, a request to configure the TOR switch for connecting a server to the network fabric; and in response to receiving the request, configure the TOR switch to connect the server to one or more ports of the TOR switch.

In one embodiment, the instructions are further configured to instruct the at least one processing device to: after connecting the TOR switch to the network fabric, receive a request to access the rack; in response to receiving the request, authenticate the request; and in response to authenticating the request, configure a lock to provide physical access to the rack.

In one embodiment, the instructions are further configured to instruct the at least one processing device to: receive a request to provide an internet connection for the server (e.g., provide IP services 843 to server 1020); and in response to receiving the request to provide the internet connection, further configure the TOR switch to provide internet connectivity to the server via one or more virtual networks of the network fabric.

In one embodiment, a lock on the door to a data center building is integrated into an electronic badge reader system. After a rack is allocated to a customer, the lock is programmed to respond to the reading of an electronic badge associated with the customer (e.g., the security badge is associated with the customer in a database record of the data center). The lock is programmed by data center software so that the customer can use the electronic badge to physically enter the data center and access the customer's rack (e.g., for installation and/or service of equipment).

Service Integration into Network Fabric

Various embodiments related to integration of network and/or other services into a network fabric of a data center are now described below. The generality of the following description is not limited by the various embodiments described above.

Prior approaches for connecting one or more services to computing equipment of a customer in which the equipment is mounted in racks of a data center (e.g., a colocation data center) are time-consuming and manually complex to configure. This creates a technical problem of an increased error rate when configuring numerous services for new equipment being installed by the customer in the data center.

Various embodiments described below provide a technological solution to the above technical problem. In one embodiment, a customer of the data center uses a client device to review various service options that are available for connecting to computing equipment of the customer in the data center. The data center receives a selection of a service provider that can provide a service to the customer's computing equipment.

In response to receiving the customer selection, the data center sends a communication to a server of the service provider. The communication includes data regarding establishing a connection over a network fabric of the data center for providing access to the service by the computing equipment of the customer. After the data center receives a confirmation from the service provider to proceed, the data center creates one or more virtual networks in the network fabric. The newly-created virtual networks are configured to provide access to the service by the computing equipment of the customer.

In another embodiment, after the data center receives the confirmation, the data center configures one or more existing virtual networks in the network fabric. The virtual networks are configured to provide the access to the service above.

In one embodiment, the service options are presented to the customer in a user interface of the client device. The user interface is configured to provide access by the customer to a "marketplace" for third-party service integration. For example, various third-party service providers are able to provide services to the data center that can be connected to computing equipment of the customer. The services from the third-party providers are integrated into the network fabric in response to service selections by the customer on the client device. In one example, the third-party providers have a presence in the data center (e.g., as a storage provider or a network provider). In one example, a customer logs into a portal of the data center and views various geographic regions presented to the customer via the user interface. The user interface presents service options that are respectively available for each of the geographic regions.

In one example, the customer selects one of the service providers above. Then, the portal sends data to a server or other computing device of the provider that is needed to make the connection over the network fabric to computing equipment in the customer's rack. In one example, an electronic handshake mechanism is used to confirm approval by the customer and provider to implement the service connection. Once approved by both the customer and provider, the data center creates one or more virtual networks to use for providing the service.

Figure 13:
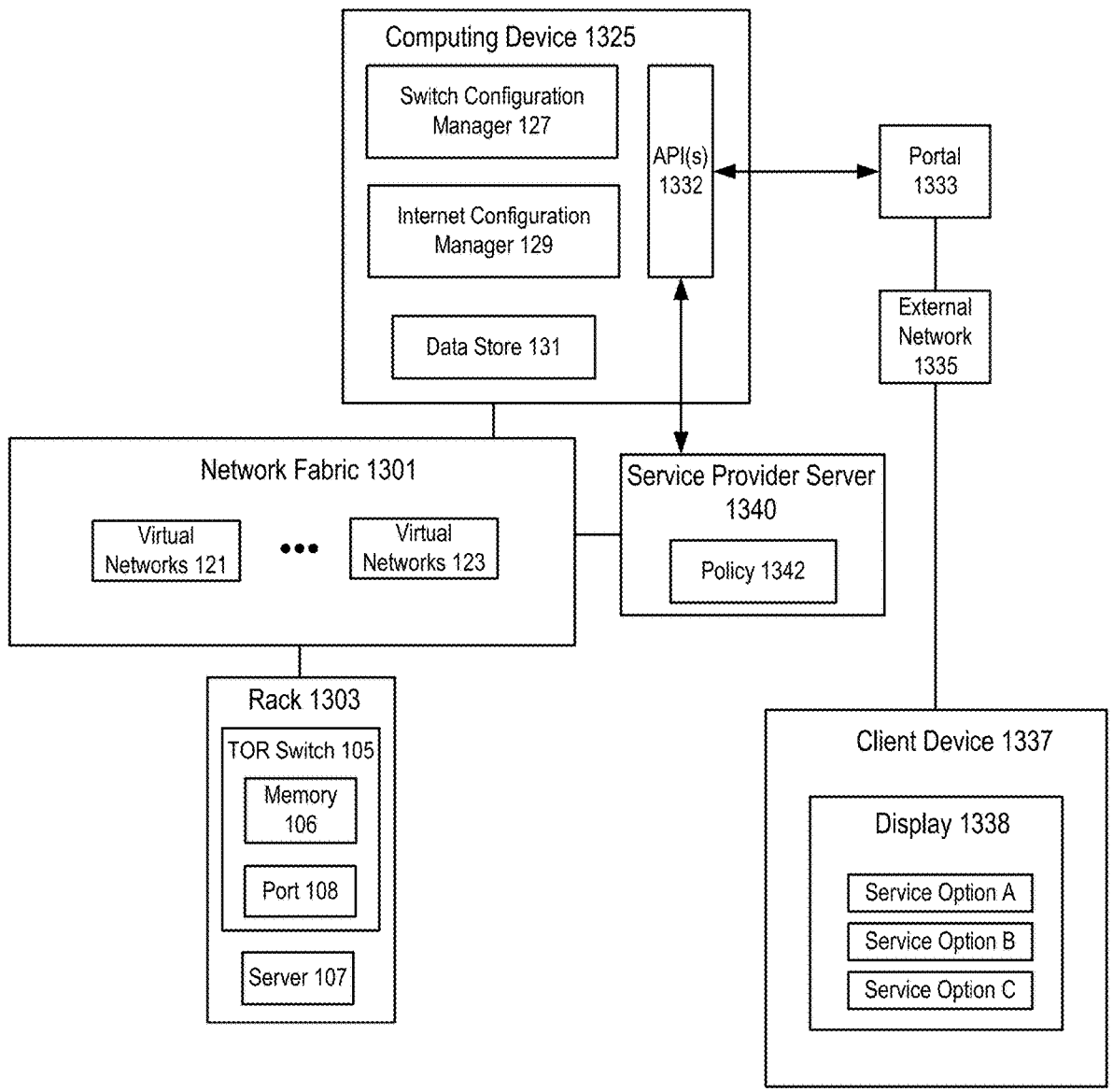
FIG. 13 shows an example data center including a network fabric that can be configured to connect various services to computing equipment mounted in various racks in the data center, according to one embodiment.

FIG. 13 shows an example data center including a network fabric 1301 that can be configured to connect various services to computing equipment mounted in various racks in the data center, according to one embodiment. For example, a service provided by service provider server 1340 can be connected for access by server 107 in rack 1303. One or more virtual networks 121, 123 of network fabric 1301 can be created and/or configured to provide connection for this access.

A client device 1337 supports a user interface that presents service options (e.g., Service Option A, B, C) for selection in a display 1338. Selections by a user of client device 1337 are communicated over external network 1335 (e.g., the Internet, a local area network, or a wide-area network) to a computing device 1325 via a portal 1333. In one embodiment, external network is a local or other network of the data center that is separate from network fabric 1301.

One or more programs executing on client device 1337 are used to communicate with computing device 1325 using an API 1332. These communications include the selections of the service options.

In response to receiving the selection of a service option from client device 1337, computing device 1325 sends one or more messages or other communications to service provider server 1340 regarding establishing a connection over network fabric 1301 for providing access to a service provided by server 1340. The communications include data regarding establishing a service connection to server 107 in rack 1303. For example, the communications include data regarding IP addresses and ports of various switches and/or other equipment to be used when providing the service.

Next, in reply to the communications above, computing device 1325 receives a communication from service provider server 1340. If server 1340 is willing to make a connection, then the communication indicates confirmation to proceed with establishing the connection.

In response to receiving the above confirmation, computing device 1325 creates and/or configures one or more virtual networks (e.g., virtual networks 121, 123) of network fabric 1301. In one example, switch configuration manager 127 is used to create and/or configure the virtual networks.

In one embodiment, in response to receiving the above confirmation, computing device 1325 further configures TOR switch 105 to connect server 107 to one or more virtual networks in network fabric 1301 that are used provide the service from server 1340.

In one embodiment, the communications above that are sent to server 1340 include data that is used to create and/or configure one or more virtual networks of network fabric 1301. In one embodiment, communications with service provider server 1340 are performed using an API 1332 supported by a program executing on computing device 1325. In one example, communications between server 1340 and computing device 1325 occur over one or more virtual networks of network fabric 1301.

In one embodiment, server 1340 sends a policy 1342 to computing device 1325. Policy 1342 sets forth one or more requirements necessary for receiving the service from server 1340. In one embodiment, policy 1342 is determined by server 1340 based on the context of server 107. In one example, the context is a security context. In one example, the context is a context of an expected or requested service performance level, and/or a context of expected or requested demand for bandwidth, quality of service, etc. In one embodiment, the one or more virtual networks created above by computing device 1325 are created in conformance with policy 1342. Server 1340 may generate and store different policies for each of various customers. The policies can be stored in a database or other data store accessible by server 1340.

In one embodiment, prior to establishing a connection to server 107 for providing the selected service, service provider server 1340 uses API 1332 to establish one or more connections to network fabric 1301. In one example, a client device (not shown) associated with server 1340 is used to provide configuration data to switch configuration manager 127. The configuration data is used to create one or more virtual networks associated with server 1340.

At a subsequent time, when a service connection is being established to server 107 as described above, then one or more virtual networks are created in response to a service request from client device 1337 and are configured for connection to the previously-created one or more virtual networks associated with server 1340 described above.

Figure 14:
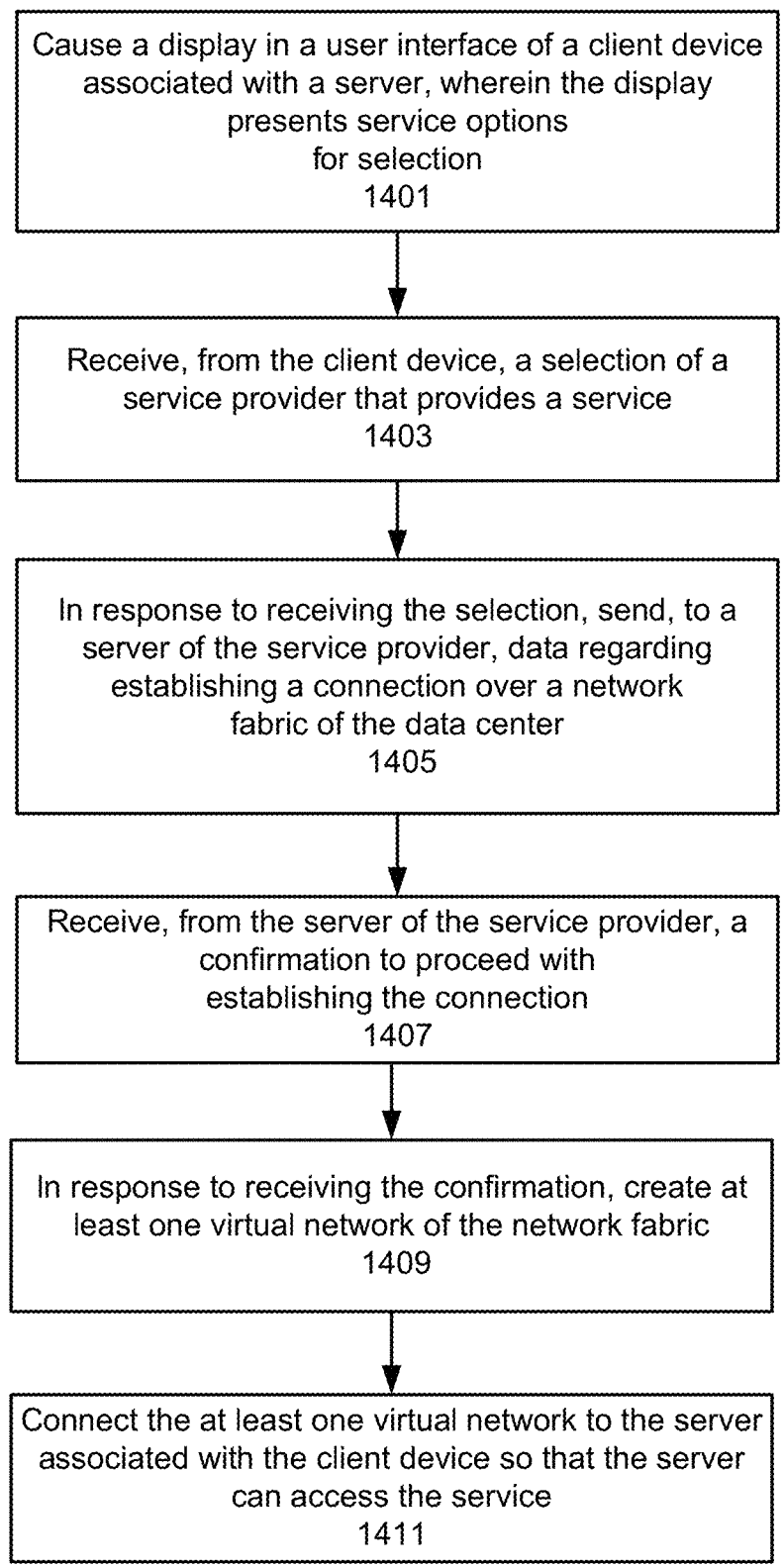
FIG. 14 shows a method for integrating services into a network fabric of a data center, according to one embodiment.

FIG. 14 shows a method for integrating services into a network fabric of a data center, according to one embodiment. For example, the method of FIG. 14 can be implemented in the system of FIGS. 1 and 13.

The method of FIG. 14 can be performed at least in part by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 14 is performed at least in part by one or more processors of computing device 1325 of FIG. 13. In one embodiment, computing device 1325 is implemented using the processors and memory of FIG. 6 or 7.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1401, a display is caused in a user interface of a client device associated with a server. The display presents service options for selection by the user of the client device. In one example, the client device is used by a customer that has installed the server in a rack of the data center. In one example, the client device is further used to configure a TOR switch to connect the server to a network fabric of the data center, such as described above.

At block 1403, a selection of a service provider is received from the client device. The service provider provides a service such as storage of data and/or internet connectivity. In one example, a service option is selected in display 1338 of client device 1337. In one example, the selected service option corresponds to a service provided by service provider server 1340. In one example, client device 1337 is associated with server 107, and is used to configure network fabric 1301 and TOR switch 105 of rack 1303.

At block 1405, in response receiving the selection from the client device, data is sent to a server of the service provider. The data regards establishing a connection over a network fabric of the data center. In one example, the data relates to performance requirements for the service, security requirements for the service, and/or network configuration information necessary for providing the service. In one example, computing device 1325 receives the selection from client device 1337. In one example, data is sent to service provider server 1340 regarding establishing a connection over network fabric 1301.

At block 1407, a confirmation is received from the server of the service provider. The confirmation indicates that the data center is to proceed with establishing a connection of the service to the server associated with the client device. In one example, electronic messages are received over a network by computer device 1325 from service provider server 1340. In one example, at least one of the electronic messages provides the confirmation to proceed.

At block 1409, in response to receiving the confirmation, at least one virtual network of the network fabric is created and/or configured. In one example, virtual networks 121 are created. In one example, virtual networks 123 are configured. In one example, virtual networks 121 are connected to virtual networks 123 in response to receiving the confirmation to proceed with establishing the connection.

At block 1411, the at least one virtual network is connected to the server associated with the client device so that the server can access the service provided by the service provider. In one example, a virtual network 121 is connected to server 107 of rack 1303. In one example, service provider server 1340 is connected to the virtual network 121.

In one embodiment, a method comprises: causing, by a first computing device (e.g., computing device 1325) via a portal, a display (e.g., display 1338) in a user interface of a client device (e.g., client device 1337), wherein the display presents service options for selection, and each service option corresponds to a respective service provided over a network fabric (e.g., network fabric 1301) of a data center; receiving, by the first computing device from the client device, a first selection of a first service provider that provides a first service; in response to receiving the first selection, sending, by the first computing device to a second computing device (e.g., service provider server 1340) associated with the first service provider, first data regarding establishing a connection over the network fabric for providing access to the first service by a server mounted in a rack (e.g., rack 1303) of the data center; receiving, by the first computing device from the second computing device, a confirmation to proceed with establishing the connection; in response to receiving the confirmation, creating at least one virtual network (e.g., virtual networks 121, 123) of the network fabric; and connecting the at least one virtual network to the server so that the server can access the first service.

In one embodiment, the at least one virtual network is created in conformance with the first data.

In one embodiment, the method further comprises receiving, by the first computing device from the second computing device, a policy (e.g., policy 1342) required by the second computing device when providing the first service.

In one embodiment, the at least one virtual network is created in conformance with the policy.

In one embodiment, the method further comprises monitoring network performance associated with providing the first service.

In one embodiment, the method further comprises replacing, based on the monitoring, the at least one virtual network with one or more new virtual networks.

In one embodiment, the method further comprises receiving, from the second computing device, a performance standard associated with the at least one virtual network, wherein the monitoring determines a failure to meet the performance standard.

In one embodiment, the service options comprise at least one of a storage service and a network service.

In one embodiment, the first service is a storage service implemented using storage hardware, and the method further comprises allocating at least a portion of the storage hardware for storing data received from the server.

In one embodiment, the first service provides internet connectivity to the server.

In one embodiment, creating the at least one virtual network comprises creating a first virtual network, and the method further comprises: prior to receiving the first selection, receiving, from the second computing device, a request to create a second virtual network; in response to receiving the request, creating the second virtual network; and in response to receiving the confirmation, connecting the first virtual network to the second virtual network.

In one embodiment, the client device is configured to communicate, over a network external to the data center (e.g., a network that is operated independently from the data center), configuration data to the second computing device, and the first service is provided in conformance with the configuration data.

In one embodiment, a system comprises: at least one processing device; and memory containing instructions configured to instruct the at least one processing device to: cause a display in a user interface of a client device, wherein the display presents service options for selection, and each service option corresponds to a respective service provided over a network fabric of a data center; receive, from the client device, a first selection of a first service provider that provides a first service; in response to receiving the first selection, send, to a server associated with the first service provider, data regarding establishing a connection over the network fabric for providing access to the first service by a computing device mounted in a rack of the data center; receive, from the server, a confirmation to proceed with establishing the connection; in response to receiving the confirmation, create a virtual network of the network fabric; and connect the virtual network to the computing device so that the computing device can access the first service.

In one embodiment, the instructions are further configured to instruct the at least one processing device to: configure a top-of-rack (TOR) switch to connect the virtual network to the TOR switch (e.g., TOR switch 105 of rack 1303).

In one embodiment, the instructions are further configured to instruct the at least one processing device to: receive, from the client device, a request to configure the TOR switch for connecting the computing device to the network fabric; and in response to receiving the request, automatically configure the TOR switch to connect the computing device to the virtual network.

In one embodiment, the request comprises a request to provide an internet connection for the computing device, and the instructions are further configured to instruct the at least one processing device to automatically configure the TOR switch to provide internet connectivity to the computing device via the virtual network.

In one embodiment, providing the internet connectivity comprises connecting the computing device to a carrier or internet service provider via the virtual network. In one example, the internet connectivity is configured by internet configuration manager 129.

In one embodiment, the instructions are further configured to instruct the at least one processing device to connect, by configuring the network fabric, the virtual network to a service provider that provides access for the computing device to internet protocol services. In one example, the network fabric is configured by switch configuration manager 127.

In one embodiment, the first service is a storage service implemented using storage hardware, and the instructions are further configured to instruct the at least one processing device to allocate at least a portion of the storage hardware for storing data received from the computing device.

In one embodiment, a non-transitory machine-readable medium stores instructions which, when executed on at least one processing device, cause the at least one processing device to at least: cause a display in a user interface of a client device associated with a server mounted in a rack of a data center, wherein the display presents service options for selection, and each service option corresponds to a respective service provided over a network fabric of the data center; receive, from the client device, a first selection of a first service provider that provides a first service; in response to receiving the first selection, send, to a computing device associated with the first service provider, data regarding establishing a connection over the network fabric; receive, from the computing device, a confirmation to proceed with establishing the connection; in response to receiving the confirmation, create at least one virtual network of the network fabric; and connect the at least one virtual network to the server so that the server can access the first service.

CLOSING

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "coupled to" generally refers to a connection between components, which can be an indirect communicative connection or direct communicative connection (e.g., without intervening components), whether wired or wireless, including connections such as electrical, optical, magnetic, etc.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple Phone) of a user may be an administrator server with respect to a paired "thing" device that is worn by the user (e.g., an Apple watch).

In some embodiments, the computing device can be a host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface.

Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system and the memory sub-system. The host system can further utilize an NVM Express (NVMe) interface to access memory components of the memory sub-system when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, and/or a combination of communication connections.

In one embodiment, the host system includes a processing device and a controller. The processing device of the host system can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

In some examples, the controller is a memory controller, a memory management unit, and/or an initiator. In one example, the controller controls the communications over a bus coupled between the host system and the memory sub-system.

In general, the controller can send commands or requests to the memory sub-system for desired access to the memory components. The controller can further include interface circuitry to communicate with the memory sub-system. The interface circuitry can convert responses received from the memory sub-system into information for the host system. The controller of the host system can communicate with the controller of the memory sub-system to perform operations such as reading data, writing data, or erasing data at the memory components and other such operations.

In some instances, a controller can be integrated within the same package as the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory.

In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

The controller of the memory sub-system can communicate with the memory components to perform operations such as reading data, writing data, or erasing data at the memory components and other such operations (e.g., in response to commands scheduled on a command bus by a controller). A controller can include a processing device (processor) configured to execute instructions stored in local memory. The local memory of the controller can include an embedded memory configured to store instructions for performing various processes, operations, logic flows, and routines that control operation of the memory sub-system, including handling communications between the memory sub-system and the host system. In some embodiments, the local memory can include memory registers storing memory pointers, fetched data, etc. The local memory can also include read-only memory (ROM) for storing micro-code. While the example memory sub-system includes the controller, in another embodiment of the present disclosure, a memory sub-system may not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory sub-system can also include additional circuitry or components that are not illustrated. In some embodiments, the memory sub-system can include a cache or buffer (e.g., DRAM or SRAM) and address circuitry (e.g., a row decoder and a column decoder) that can receive an address from the controller and decode the address to access the memory components.

What is claimed is:

1. A method, comprising:
    causing a display, in a user interface of a client device, of a plurality of service provider options and a plurality of service options to be provided by each service provider of the plurality of service provider options;
    receiving, by a first computing device and from the client device, a first selection of a first service provider from the plurality of service provider options and a second selection of a first service from the plurality of service options to be provided by the first service provider,
        wherein the first service provider providing the first service is a different provider than a data center provider of a data center;
    in response to receiving the first selection, sending, by the first computing device to a second computing device associated with the first service provider, first data regarding establishing a connection over a network fabric of the data center for providing access to the first service by a server associated with the client device that is mounted in a rack of the data center,
        wherein the connection is to be established between the second computing device and the server associated with the client device, and
    receiving, by the first computing device and from the second computing device, a confirmation to proceed with establishing the connection;
    in response to receiving the confirmation to proceed with the establishing of the connection, creating at least one virtual network in the network fabric as part of the connection according to a policy specified by the second computing device, and grouping the at least one virtual network according to a function type of the at least one virtual network; and
    connecting, in response to receiving the confirmation, the at least one virtual network to the server of the rack associated with the client device by configuring a top-of-rack switch of the rack to connect the top-of-rack switch to the at least one virtual network so that the server of the rack associated with the client device can access the first service via the top-of-rack switch such that the first service is integrated into services of the data center.

2. The method of claim 1, wherein the at least one virtual network is created in conformance with the first data.

3. The method of claim 1, further comprising receiving, by the first computing device from the second computing device, the policy required by the second computing device when providing the first service.

4. The method of claim 3, wherein the at least one virtual network is created in conformance with the policy.

5. The method of claim 1, further comprising monitoring network performance associated with providing the first service.

6. The method of claim 5, further comprising replacing, based on the monitoring, the at least one virtual network with one or more new virtual networks.

7. The method of claim 6, further comprising receiving, from the second computing device, a performance standard associated with the at least one virtual network, wherein the monitoring determines a failure to meet the performance standard.

8. The method of claim 1, wherein the first service comprises at least one of a storage service and a network service.

9. The method of claim 1, wherein the first service is a storage service implemented using storage hardware, the method further comprising allocating at least a portion of the storage hardware for storing data received from the server.

10. The method of claim 1, wherein the first service provides internet connectivity to the server.

11. The method of claim 1, wherein creating the at least one virtual network comprises creating a first virtual network, the method further comprising:
  prior to receiving the first selection, receiving, from the second computing device, a request to create a second virtual network;
  in response to receiving the request, creating the second virtual network; and
  in response to receiving the confirmation, connecting the first virtual network to the second virtual network.

12. The method of claim 1, wherein the client device is configured to communicate, over a network external to the data center, configuration data to the second computing device, and wherein the first service is provided in conformance with the configuration data.

13. A system, comprising:
  at least one processing device; and
  memory containing instructions configured to instruct the at least one processing device to:
    cause a display, in a user interface of a client device, of a plurality of service provider options and a plurality of service options to be provided by each service provider of the plurality of service provider options;
    receive, by a first computing device from a client device, a first selection of a first service provider from the plurality of service provider options and a second selection of a first service from the plurality of service options to be provided by the first service provider,
      wherein the first service provided by the first provider is a different provider than a data center provider of a data center;
    in response to receiving the first selection, send, by the first computing device to a second computing device associated with the first service provider, first data regarding establishing a connection over a network fabric of the data center for providing access to the first service by a server associated with the client device that is mounted in a rack of the data center, wherein the connection is to be established between the second computing device and the server associated with the client device, and
    receive, by the first computing device from the second computing device, a confirmation to proceed with establishing the connection;
    in response to receiving the confirmation to proceed with the establishing of the connection, create at least one virtual network in the network fabric as part of the connection according to a policy specified by the second computing device, and group the at least one virtual network according to a function type of the at least one virtual network; and
    connect, in response to receiving the confirmation, the at least one virtual network to the server of the rack associated with the client device by configuring a top-of-rack switch of the rack to connect the top-of-rack switch to the at least one virtual network so that the server of the rack associated with the client device can access the first service via the top-of-rack switch such that the first service is integrated into services of the data center.

14. The system of claim 13, wherein the instructions are further configured to instruct the at least one processing device to:
  configure at least one port of the top-of-rack switch to the at least one virtual network.

15. The system of claim 14, wherein the instructions are further configured to instruct the at least one processing device to:
  receive, from the client device, a request to configure the top-of-rack switch for connecting the computing device to the network fabric; and
  in response to receiving the request, automatically configure the top-of-rack switch to connect the computing device to the virtual network.

16. The system of claim 15, wherein the request comprises a request to provide an internet connection for the computing device, and wherein the instructions are further configured to instruct the at least one processing device to automatically configure the top-of-rack switch to provide internet connectivity to the computing device via the virtual network.

17. The system of claim 16, wherein providing the internet connectivity comprises connecting the computing device to a carrier or internet service provider via the virtual network.

18. The system of claim 13, wherein the instructions are further configured to instruct the at least one processing device to connect, by configuring the network fabric, the virtual network to a service provider that provides access for the computing device to internet protocol services.

19. The system of claim 13, wherein the first service is a storage service implemented using storage hardware, and wherein the instructions are further configured to instruct the at least one processing device to allocate at least a portion of the storage hardware for storing data received from the computing device.

20. A non-transitory machine-readable medium storing instructions which, when executed on at least one processing device, cause the at least one processing device to at least:
  cause a display, in a user interface of a client device, of a plurality of service provider options and a plurality of service options to be provided by each service provider of the plurality of service provider options;
  receive, by a first computing device from a client device, a selection of a first service provider from the plurality of service provider options and a second selection of a first service from the plurality of service options to be provided by the first service provider,
    wherein the service provided by the first service provider is a different provider than a data center provider of a data center;
  in response to receiving the selection, send, by the first computing device to a second computing device associated with the first service provider, data regarding establishing a connection over a network fabric of the data center for providing access to the service by a server associated with the client device that is mounted in a rack of the data center, wherein the connection is to be established between the second computing device and the server associated with the client device, and receive, by the first computing device from the second computing device, a confirmation to proceed with establishing the connection;

in response to receiving the confirmation to proceed with the establishing of the connection, create at least one virtual network in the network fabric as part of the connection according to a policy specified by the second computing device, and group the at least one virtual network according to a function type of the at least one virtual network; and connect, in response to receiving the confirmation, the at least one virtual network to the server of the rack associated with the client device by configuring a top-of-rack switch of the rack to connect the top-of-rack switch to the at least one virtual network.

* * * * *